(12) United States Patent
Joly et al.

(10) Patent No.: US 8,980,969 B2
(45) Date of Patent: *Mar. 17, 2015

(54) ADDITION-FRAGMENTATION AGENTS

(75) Inventors: Guy D. Joly, Shoreview, MN (US); Ahmed S. Abuelyaman, Woodbury, MN (US); Bradley D. Craig, Lake Elmo, MN (US); Afshin Falsafi, Woodbury, MN (US); Joel D. Oxman, Minneapolis, MN (US); Larry R. Krepski, White Bear Lake, MN (US); William H. Moser, Edina, MN (US); Serkan Yurt, Woodbury, MN (US); Ann R. Fornof, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/239,160

(22) PCT Filed: Aug. 14, 2012

(86) PCT No.: PCT/US2012/050725
§ 371 (c)(1),
(2), (4) Date: Feb. 17, 2014

(87) PCT Pub. No.: WO2013/028401
PCT Pub. Date: Feb. 28, 2013

(65) Prior Publication Data
US 2014/0206788 A1 Jul. 24, 2014

Related U.S. Application Data

(60) Provisional application No. 61/526,470, filed on Aug. 23, 2011.

(51) Int. Cl.
| | | |
|---|---|---|
| *C09D 133/08* | (2006.01) | |
| *C08F 2/38* | (2006.01) | |
| *C08F 22/10* | (2006.01) | |
| *C09D 133/04* | (2006.01) | |
| *C08F 30/02* | (2006.01) | |
| *C08F 30/08* | (2006.01) | |

(52) U.S. Cl.
CPC ............... *C09D 133/08* (2013.01); *C08F 2/38* (2013.01); *C08F 22/10* (2013.01); *C08F 30/02* (2013.01); *C08F 30/08* (2013.01); *C09D 133/04* (2013.01); *C08F 2438/03* (2013.01)
USPC ............... 522/33; 524/556; 560/199; 558/87; 558/180; 556/420; 522/64

(58) Field of Classification Search
CPC ...... C09D 133/08; C09D 133/04; C08F 2/38; C08F 22/10; C08F 30/02; C08F 30/08
USPC ......... 522/33, 64; 524/556; 560/199; 558/87, 558/180; 556/420
See application file for complete search history.

(56) References Cited

U.S. PATENT DOCUMENTS

| | | |
|---|---|---|
| 2,801,185 A | 7/1957 | Iler |
| 4,503,169 A | 3/1985 | Randklev |
| 4,522,958 A | 6/1985 | Das |
| 4,547,323 A | 10/1985 | Carlson |
| 4,886,861 A | 12/1989 | Janowicz |
| 5,130,347 A | 7/1992 | Mitra |
| 5,324,879 A | 6/1994 | Hawthorne |
| 6,284,898 B1 | 9/2001 | Mosner |
| 6,376,590 B2 | 4/2002 | Kolb |
| 6,572,693 B1 | 6/2003 | Wu |
| 6,586,483 B2 | 7/2003 | Kolb |
| 6,730,156 B1 | 5/2004 | Windisch |
| 6,794,520 B1 | 9/2004 | Moszner |
| 6,893,731 B2 | 5/2005 | Kausch |
| 7,090,721 B2 | 8/2006 | Craig |
| 7,090,722 B2 | 8/2006 | Budd |
| 7,156,911 B2 | 1/2007 | Kangas |
| 7,429,422 B2 | 9/2008 | Davidson |
| 7,649,029 B2 | 1/2010 | Kolb |
| 2006/0009574 A1 * | 1/2006 | Aert et al. ............ 524/832 |
| 2009/0011388 A1 | 1/2009 | Craig |
| 2010/0311858 A1 | 12/2010 | Holmes |
| 2011/0196062 A1 | 8/2011 | Craig |
| 2012/0208965 A1 | 8/2012 | Joly |

FOREIGN PATENT DOCUMENTS

| | | |
|---|---|---|
| WO | WO 2008-064972 | 6/2008 |
| WO | WO 2012-112304 | 8/2012 |
| WO | WO 2012-112321 | 8/2012 |
| WO | WO 2012-112350 | 8/2012 |
| WO | WO 2013-028397 | 2/2013 |

OTHER PUBLICATIONS

Admson, "Aminoalkyl tertiary carbinols and derived products. Part I. 3-Amino-1: 1 diphenylpropan-1-ols", Journal of the Chemical Society (Resumed), 1949, vol. 1949, pp. S144-S155.

Ausiello, "Effect of adhesive layer properties on stress distribution in composite restorations—a 3D finite element analysis", Dental Materials, Jun. 2002, vol. 18, No. 4, pp. 295-303.

Benes, "Reactive Polymeric Carriers Obtained by Suspension Polymerization of Hydroxyethyl Methacrylate Sulphonates", Collection of Czechoslovak, Chem. Commun. Mar. 1983, vol. 48, pp. 3065-3070.

Hutson, "Chain Transfer Activity of ö-Unsaturated Methacrylic Oligomers in Polymerizations of Methacrylic Monomers", Macromolecules, Jun. 2004, vol. 37, No. 12, pp. 4441-4452. XP55020970.

Moad, "Chain Transfer Activity of ö-Unsaturated Methyl Methacrylate Oligomers", Macromolecules, 1996, vol. 29, No. 24, pp. 7717-7726.

(Continued)

*Primary Examiner* — Michael M Bernshteyn
(74) *Attorney, Agent, or Firm* — Kent S. Kokko

(57) ABSTRACT

Addition-fragmentation agents of the formula are disclosed having the following functional groups: 1) a labile addition-fragmentation group that can cleave and reform to relieve strain, 2) a free-radically polymerizable group, and 3) a surface-modifying functional group that associates with the surface of a substrate.

15 Claims, 1 Drawing Sheet

(56) References Cited

OTHER PUBLICATIONS

Moad, "Radical addition-fragmentation chemistry in polymer synthesis", Polymer, 2008, vol. 49, No. 5, pp. 1079-1131.
Oliveira, "Effect of low-elastic modulus liner and base as stress-absorbing layer in composite resin restorations", Dental Materials, Mar. 2010, vol. 26, No. 3, pp. e159-e169.
Watts, "Determination of Polymerization Shrinkage Kinetics in Visible-Light-Cured materials: methods development", Dental Materials, Oct. 1991, vol. 7, pp. 281-287.
International Search Report for PCT International Application No. PCT/US2012/050725 Mailed on Nov. 23, 2012, 4 pages.

* cited by examiner

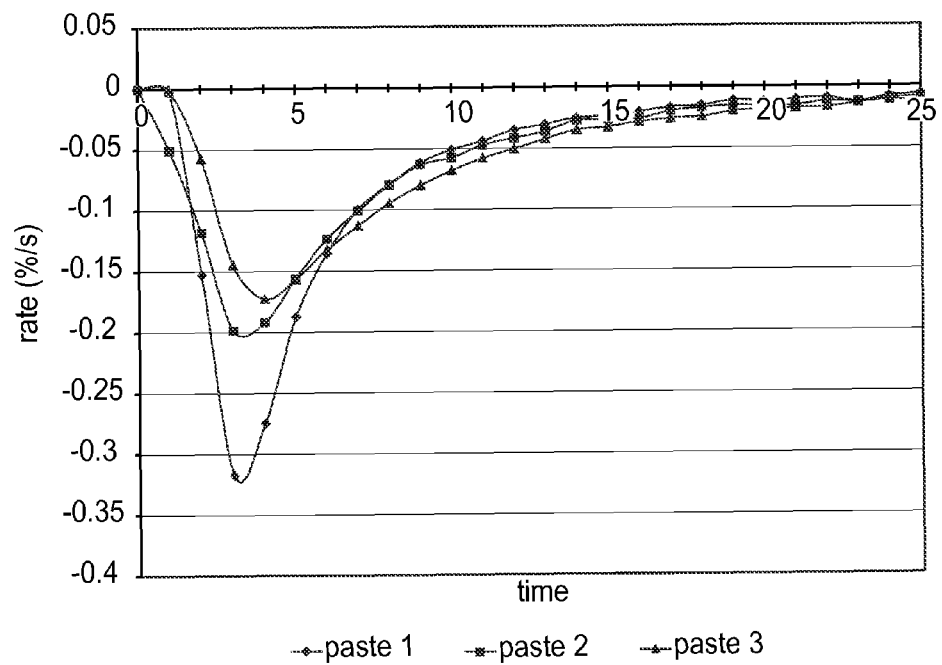

ADDITION-FRAGMENTATION AGENTS

CROSS REFERENCE TO RELATED APPLICATIONS

This application is a national stage filing under 35 U.S.C. 371 of PCT/US2012/050725, filed Aug. 14, 2012, which claims priority to Provisional Application No. 61/526,470, filed Aug. 23, 2011, the disclosure of which is incorporated by reference in its/their entirety herein.

BACKGROUND

The present disclosure provides novel addition-fragmentation agents for use in low-stress polymerizable compositions. Free-radical polymerization is typically accompanied by a reduction in volume as monomers are converted to polymer. The volumetric shrinkage produces stress in the cured composition, leading to a microcracks and deformation. Stress transferred to an interface between the cured composition and a substrate can cause failure in adhesion and can affect the durability of the cured composition.

The addition-fragmentation agents of this disclosure provide stress relief by including labile crosslinks that can cleave and reform during the polymerization process. Crosslink cleavage may provide a mechanism to allow for network reorganization, relieve polymerization stress, and prevent the development of high stress regions. The instant addition-fragmentation agents may further provide stress relief by delaying the gel point, the point at which the polymerizable composition transitions from a viscous material to an elastic solid. The longer the polymerizable mixture remains viscous, the more time available during which material flow can act to alleviate stress during the polymerization process.

The addition-fragmentation agents provide novel stress-reducing crosslinking agents that have application in dental compositions, thin films, hardcoats, composites, adhesives, and other uses subject to stress reduction. In addition, the addition-fragmentation process results in a chain-transfer event that provides novel polymers that may be further functionalized.

SUMMARY

The present disclosure provides addition-fragmentation agents having the following functional groups: 1) a labile addition-fragmentation group that and that can cleave and reform to relieve strain, 2) a free-radically polymerizable group, and 3) a surface-modifying functional group that associates with the surface of a substrate. In addition, the addition-fragmentation agents may crosslink a polymer.

The addition-fragmentation agents may be added to polymerizable monomer mixtures to reduce the polymerization-induced stresses. In embodiments where Z is ≥2, the agents further function as addition-fragmentation crosslinking agents, where the crosslinks are labile. This disclosure further provides a method of preparing the addition-fragmentation agents of formula I, as further disclosed herein.

This disclosure further provides a curable composition comprising the addition-fragmentation agent and one or more free-radically polymerizable monomers, the addition-fragmentation agent providing a reduction in stress of the resultant polymers. The addition-fragmentation agents act as chain-transfer agents via an addition-fragmentation process whereby the crosslinks are labile during polymerization and continuously cleave and reform, providing a reduction in polymerization-based stress.

This disclosure further provides a curable composition that has a surface-modifying functional group that would bond to or associate with, a substrate surface. As result, curable compositions of this disclosure are self-bonding or self-priming.

As used herein:

"acryloyl" is used in a generic sense and mean not only derivatives of acrylic acid, but also amine, and alcohol derivatives, respectively;

"(meth)acryloyl" includes both acryloyl and methacryloyl groups; i.e. is inclusive of both esters and amides.

"curable" means that a coatable material can be transformed into a solid, substantially non-flowing material by means of free-radical polymerization, chemical cross linking, radiation crosslinking, or the like.

"alkyl" includes straight-chained, branched, and cycloalkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent, i.e. monvalent alkyl or polyvalent alkylene.

"heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"aryl" is an aromatic group containing 5-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

BRIEF DESCRIPTION OF THE FIGURES

FIG. 1 is a graph of Watts Shrinkage of curable compositions of the Examples.

DETAILED DESCRIPTION

The present disclosure provides addition-fragmentation agents having the following functional groups: 1) a labile addition-fragmentation group that that can cleave and reform to relieve strain, 2) a free-radically polymerizable group, and 3) a surface-modifying organic functional group that associates with the surface of a substrate. In some embodiments, the addition fragmentation agents can crosslink the polymer.

The addition-fragmentation group allows the crosslinking of a polymer system, in which the labile group can be added to, fragment, and be added to again by a growing polymer chain to reduce the stress on the growing polymer or polymeric network. Such groups may be selected from those described in G. Moad et al., Radical addition-fragmentation chemistry in polymer synthesis, *Polymer*, Vol. 49, No. 5. (3 Mar. 2008), pp. 1079-1131.

In one preferred embodiment, the present disclosure provides addition-fragmentation agents of the formula:

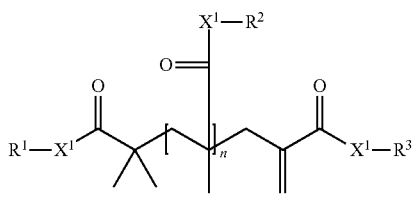

I wherein $R^1$, $R^2$ and $R^3$ are each independently $Z_m$-Q-, $Y_p$-Q'-, a (hetero)alkyl group or a (hetero)aryl group with the proviso that at least one of $R^1$, $R^2$ and $R^3$ is $Z_m$-Q-, and with the proviso that at least one of $R^1$, $R^2$ and $R^3$ is $Y_p$-Q'-

Q is a covalent bond or a linking group, preferably an organic (hetero)hydrocarbyl linking group having a valence of m+1;

Q' is a covalent bond or an or a linking group, preferably an organic (hetero)hydrocarbyl linking group having a valence of p+1;

Z is an ethylenically unsaturated polymerizable group,

Y is a surface-modifying functional group that associates with a substrate on which the addition-fragmentation agent is disposed;

m is 1 to 6;

p is 1 or 2;

each $X^1$ is independently —O— or —$NR^4$—, where $R^4$ is H or $C_1$-$C_4$ alkyl, and n is 0 or 1. It will be further understood that each of $R^1$, $R^2$ and $R^3$ may contain both a $Z_m$-Q- and a $Y_p$-Q'- group, i.e. both the polymerizable group and the surface-modifying group are part of the same "R" group.

The present disclosure provides addition-fragmentation agents of the Formula I, supra. The ethylenically unsaturated moiety, Z, of the monomer may include, but is not limited to the following structures, including (meth)acryloyl, vinyl, styrenic and ethynyl, that are more fully described in reference to the preparation of the compounds below.

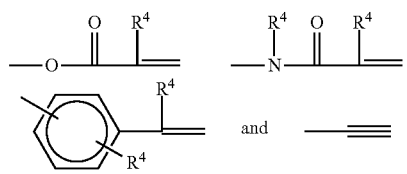

wherein $R^4$ is H or $C_1$-$C_4$ alkyl.

With further respect to Formula I, particularly useful Y groups ($R^1$—$X^1$— groups and optionally $R^2$—$X^1$— and $R^3$—$X^1$ groups) include a monophosphate, a phosphonate, a phosphonic acid, a hydroxamic acid, a carboxylic acid, and acetoacetate, an anhydride, an isonitrile group, a silyl, a disulfide, a thiol, an amino, a sulfuric acid, a sulfonic acid, a phosphine, a phenolic (including catechols and 1,2,3-trihydroxy benzene derivatives), or a heterocyclic aromatic group. Of particular interest is Y selected as a silyl group of the formula —$SiR^7_3$, wherein each $R^7$ group is independently selected from the group of alkoxy, acetoxy, and halide.

It is believed that the addition-fragmentation agent follows an addition fragmentation pathway as shown in the following Scheme 1. In this scheme the crosslinking agent of Formula I is shown, where n is 0. In the step 1, a free radical species P• adds to the crosslinking agent. The crosslinking agent then fragments as shown in step 2 to form the stable α-carbonyl tertiary radical and the α,β-unsaturated ester bearing the residue of the free radical species P•. This α,β-unsaturated ester can undergo radical addition as shown in step 5. The radical addition may be initiated by an initiator or a polymer radical.

Concurrently the α-carbonyl tertiary radical can initiate polymerization of monomer as shown in step 3. For purposes of illustration, a methacrylate monomer is illustrated. On monomer addition, a methacrylate-terminated radical intermediate is produced. In the presence of the crosslinking agent of Formula 1 (as shown in step 4) both addition, and fragmentation, yielding a tertiary radical, occurs.

Scheme 1.

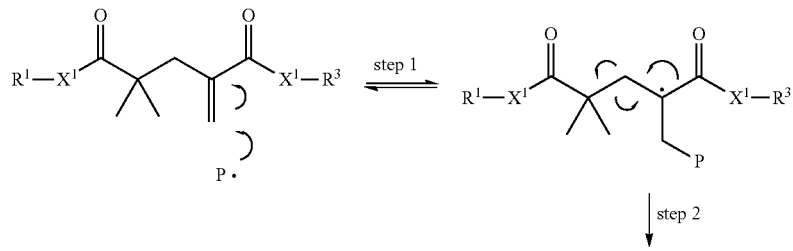

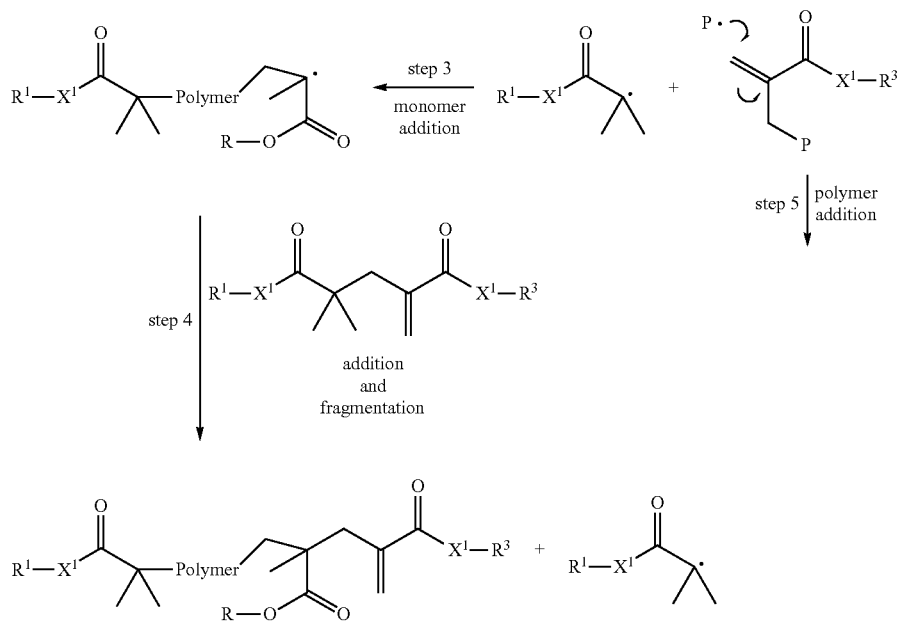

As shown in the following Scheme 2, the addition-fragmentation crosslinking agents provide multiple potential mechanisms for stress relief. A simplified methacrylate polymer is shown crosslinked by the two "Z" groups of the addition fragmentation crosslinking agent. The bonds between the ethylenically unsaturated Z groups will form labile crosslinks. Fragmentation of the addition-fragmentation crosslinking agent provides a mechanism for crosslink cleavage. The cleavage of labile crosslinks may allow the polymeric network to relax or reorganize, especially in high stress regions, providing a potential mechanism for stress relief.

Scheme 2

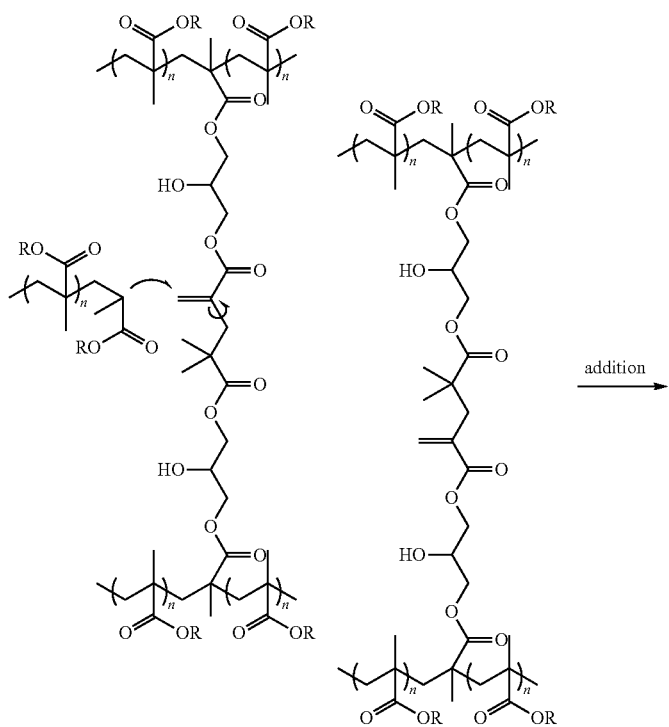

-continued
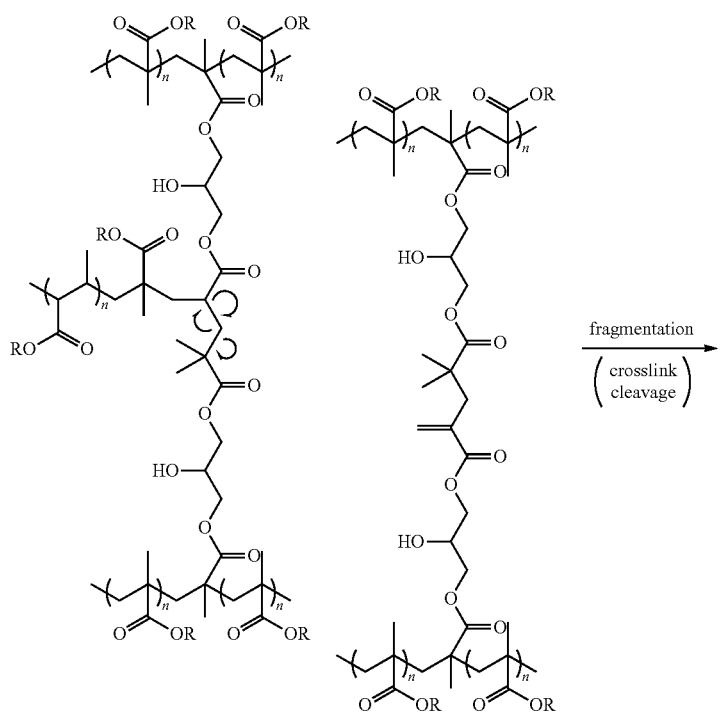
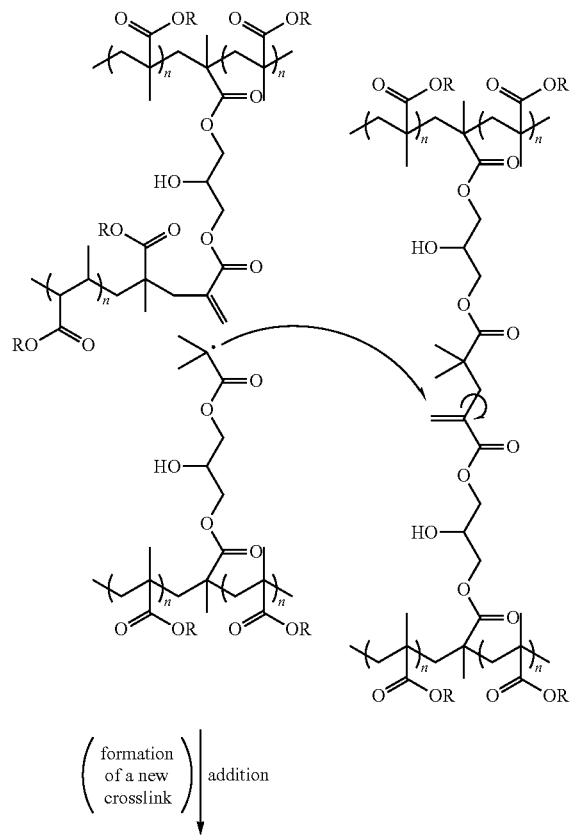

-continued

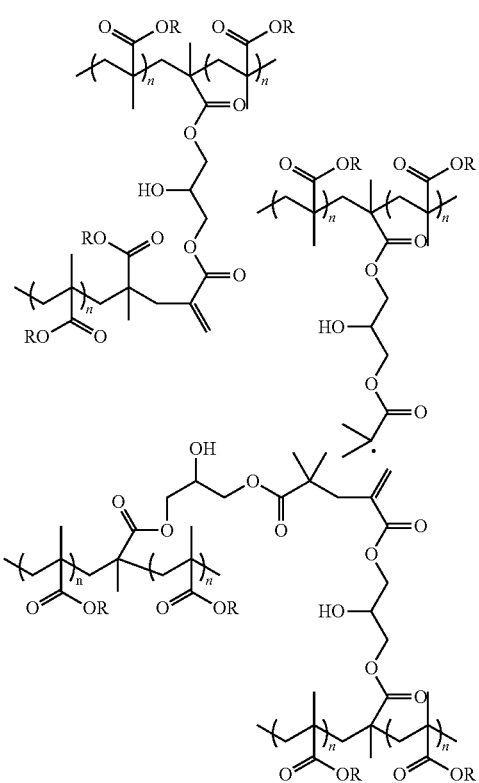
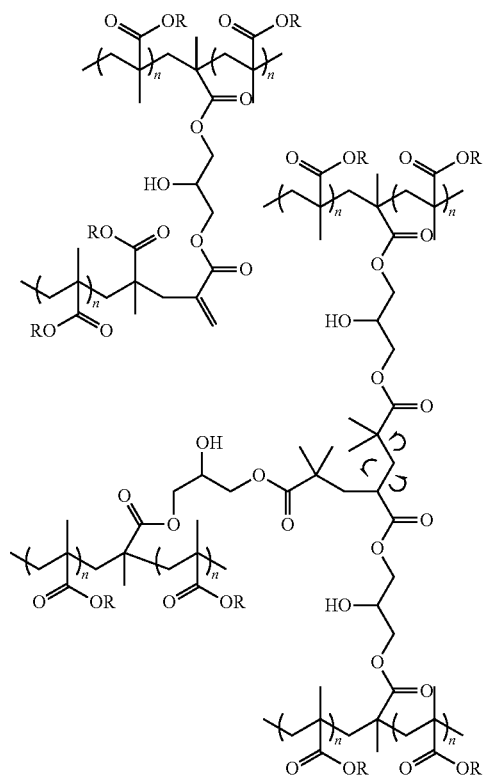

Stress relief could also be a result of attenuated reaction rates (slower cure rates) in the presence of addition-fragmentation materials. The addition of a radical to the addition-fragmentation crosslinking agent generates a potentially long-lived, tertiary radical (the product of step 1, Scheme 1). This long-lived radical intermediate can revert back to starting materials, add to monomer, or fragment. If fragmentation, retro-addition and monomer addition are slow relative to addition, the intermediate tertiary radical will be relatively long-lived. This long-lived radical intermediate will then act as a radical reservoir, slowing down the overall polymerization process. Attenuated cure rates could serve to delay the transition of a material from a viscous material to an elastic solid, delaying the gel point. Post-gel shrinkage is a major component in stress development; therefore, delaying the gel point even slightly may lead to stress relief by allowing additional time for material to flow during the curing process. Therefore, even compounds of Formula I, having a single Z group, may be used to reduce polymerization stress.

The compounds of Formula I may be prepared from (meth) acrylate dimers and trimers by substitution, displacement or condensation reactions. The starting (meth)acrylate dimers and trimers may be prepared by free radical addition of a (meth)acryloyl monomer in the presence of a free radical initiator and a cobalt (II) complex catalyst using the process of U.S. Pat. No. 4,547,323 (Carlson), incorporated herein by reference. Alternatively, the (meth)acryloyl dimers and trimers may be prepared using a cobalt chelate complex using the processes of U.S. Pat. No. 4,886,861 (Janowicz) or U.S. Pat. No. 5,324,879 (Hawthorne), incorporated herein by reference. In either process, the reaction mixture can contain a complex mixture of dimers, trimers, higher oligomers and polymers and the desired dimer or trimer can be separated from the mixture by distillation.

With reference to Formula I, the requisite ethylenically unsaturated "Z" group may be incorporated into the (meth) acryloyl dimer or trimer by means including addition, condensation, substitution and displacement reaction. In general, one or more of the acyl groups of the (meth)acryloyl dimer or trimer is provided with the $Z-Q-X^1$— group of Formula I.

More specifically, a (meth)acryloyl compound of the formula:

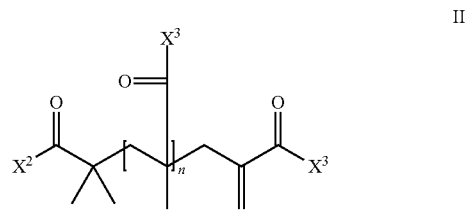

II wherein $X^2$ comprises an electrophilic or nucleophilic functional group, $X^3$ is $X^2$, $X^1$—$R^2$ or $X^1$—$R^3$, and n is 0 or 1;

is reacted with a co-reactive compounds of the formulas:

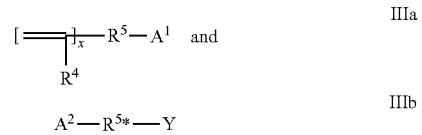

IIIa

IIIb wherein

A$^1$ and A$^2$ are each a functional group that is co-reactive with functional group X$^2$, R$^4$ is hydrogen, a C$_1$ to C$_4$ alkyl group, R$^5$ and R$^{5*}$ are each a single bond or a di- or trivalent (hetero)hydrocarbyl linking group that joins the ethylenically unsaturated group to reactive functional group A$^1$ and A$^2$, and x is 1 or 2. As result of the reaction, the addition-fragmentation agents are provided with both a free-radically polymerizable group Z and a surface-modifying functional group Y. It will be understood that the reactions with the compounds of formulas IIIa and b may be concurrent or sequential, and the stoichiometry of the reactant is selected so that the resulting addition-fragmentation agents have at least one free radically polymerizable group Z and at least one surface-modifying functional group Y, on average.

Preferably a compound of Formula II is reactive with a compound of Formula IIIa, where A$^1$ comprises an epoxy or aziridine functional group. The reaction product has, in addition to the requisite free-radically polymerizable group Z, a hydroxyl group or amine group that may be further functionalized to provide the requisite surface-modifying functional group Y.

More specifically, R$^5$ and R$^{5*}$ are each a single bond or a di- or trivalent linking group that joins an ethylenically unsaturated group to co-reactive functional group A and preferably contains up to 34, preferably up to 18, more preferably up to 10, carbon and, optionally, oxygen and nitrogen atoms, optional catenary ester, amide, urea, urethane and carbonate groups. When R$^5$ or R$^{5*}$ are not a single bond, is may be selected from —O—, —S—, —NR$^4$—, —SO$_2$—, —PO$_2$—, —CO—, —OCO—, —NR$^4$—CO—, NR$^4$—CO—O—, NR$^4$—CO—NR$^4$—, —R$^6$— and combinations thereof, such as —CO—O—R$^6$—, —CO—NR$^4$—R$^6$—, and —R$^6$—CO—O—R$^6$—.

wherein each R$^4$ is hydrogen, a C$_1$ to C$_4$ alkyl group, or aryl group, each R$^6$ is an alkylene group having 1 to 6 carbon atoms, a 5- or 6-membered cycloalkylene group having 5 to 10 carbon atoms, or a divalent aromatic group having 6 to 16 carbon atoms; A$^1$ is a reactive functional group capable of reacting with a co-reactive functional group for the incorporation of a free-radically polymerizable functional "Z" group and A$^2$ is a reactive functional group capable of reacting with a co-reactive functional group for the incorporation of a surface-modifying functional "Y" group.

It will be understood that reaction between the X$^2$ group of Formula II and the A$^1$ group of Formula III will form the Z$_m$-Q-X$^1$— moiety of Formula I, therefore Q may be defined as —R$^5$-A*-X$^{2*}$—, where A$^{1*}$-X$^{2*}$— is the bond formed between A$^1$ and X$^2$, as described supra. Therefore Q may be defined as single bond or a divalent linking (hetero)hydrocarbyl group. More particularly, Q a single bond or a divalent linking group that joins an ethylenically unsaturated group to co-reactive functional group A and preferably contains up to 34, preferably up to 18, more preferably up to 10, carbon and, optionally, oxygen and nitrogen atoms, optional catenary ester, amide, urea, urethane and carbonate groups. When Q is not a single bond, it may be selected from —O—, —S—, —NR$^4$—, —SO$_2$—, —PO$_2$—, —CO—, —OCO—, —R$^6$— and combinations thereof, such as NR$^4$—CO—NR$^4$—, NR$^4$—CO—O—, NR$^4$—CO—NR$^4$—CO—O—R$^6$—, —CO—NR$^4$—R$^6$—, and —R$^6$—CO—O—R$^6$—, —O—R$^6$—, —S—R$^6$—, —NR$^4$—R$^6$—, —SO$_2$—R$^6$—, —PO$_2$—R$^6$—, —CO—R$^6$—, —OCO—R$^6$—, —NR$^4$—CO—R$^6$—, NR$^4$—R$^6$—CO—O—, NR$^4$—CO—NR$^4$—, —R$^6$—, with the proviso that Q-Z does not contain peroxidic linkages, i.e. O—O, N—O, S—O, N—N, N—S bonds, wherein each R$^4$ is hydrogen, a C$_1$ to C$_4$ alkyl group, or aryl group, each R$^6$ is an alkylene group having 1 to 6 carbon atoms, a 5- or 6-membered cycloalkylene group having 5 to 10 carbon atoms, or a divalent arylene group having 6 to 16 carbon atoms.

Similarly the reaction between the X$^2$ group of Formula II and the A$^2$ group of Formula IIIb will form the Y$_p$-Q'- moiety of Formula I.

In reference to Formula I, particularly useful Z groups (R$^1$—X$^1$— groups and optionally R$^2$—X$^1$— groups) include H$_2$C=C(CH$_3$)C(O)—O—CH$_2$—CH(OH)—CH$_2$—O—, H$_2$C=C(CH$_3$)C(O)—O—CH$_2$—CH(O—(O)C(CH$_3$)=CH$_2$)—CH$_2$—O—, H$_2$C=C(CH$_3$)C(O)—O—CH(CH$_2$OC$_6$H$_5$)—CH$_2$—O—, H$_2$C=C(CH$_3$)C(O)—O—CH$_2$CH$_2$—N(H)—C(O)—O—CH(CH$_2$OC$_6$H$_5$)—CH$_2$—O—, H$_2$C=C(CH$_3$)C(O)—O—CH$_2$—CH(O—(O)C—N(H)—CH$_2$CH$_2$—O—(O)C(CH$_3$)C=CH$_2$)—CH$_2$—O—, H$_2$C=C(H)C(O)—O—(CH$_2$)$_4$—O—CH$_2$—CH(OH)—CH$_2$—O—, H$_2$C=C(CH$_3$)C(O)—O—CH$_2$—CH(O—(O)C—N(H)—CH$_2$CH$_2$—O—(O)C(CH$_3$)C=CH$_2$)—CH$_2$—O—, CH$_3$—(CH$_2$)$_7$—CH(O—(O)C—N(H)—CH$_2$CH$_2$—O—(O)C(CH$_3$)C=CH$_2$)—CH$_2$—O—, H$_2$C=C(H)C(O)—O—(CH$_2$)$_4$—O—CH$_2$—CH(—O—(O)C(H)=CH$_2$)—CH$_2$—O— and H$_2$C=C(H)C(O)—O—CH$_2$—CH(OH)—CH$_2$—O—, H$_2$C=C(H)C(O)—O—(CH$_2$)$_4$—O—CH$_2$—CH(—O—(O)C(H)=CH$_2$)—CH$_2$—O—, and CH$_3$—(CH$_2$)$_7$—CH(O—(O)C—N(H)—CH$_2$CH$_2$—O—(O)C(CH$_3$)C=CH$_2$)—CH$_2$—O—.

Preferably the compound of Formula II is reacted with an aziridine- or epoxy-functional (meth)acryloyl, as illustrated in Scheme III. It will be understood that different isomers from those depicted may result from the ring-opening. In Scheme III, transverse methyl groups are indicated as attached to either of the adjacent carbon atoms. The illustrated products, having an amine or hydroxyl groups respectively, may then be provided with the surface-modifying functional group by reaction with a compound of the formula IIb: A$^2$-R$^{5*}$—Y. For example, the illustrated products may be provided with silyl surface-modifying groups by reaction with a silylalkylisocyanate. Note also the reaction with methylaziridine may result in a mixture of acrylate and acrylamide products.

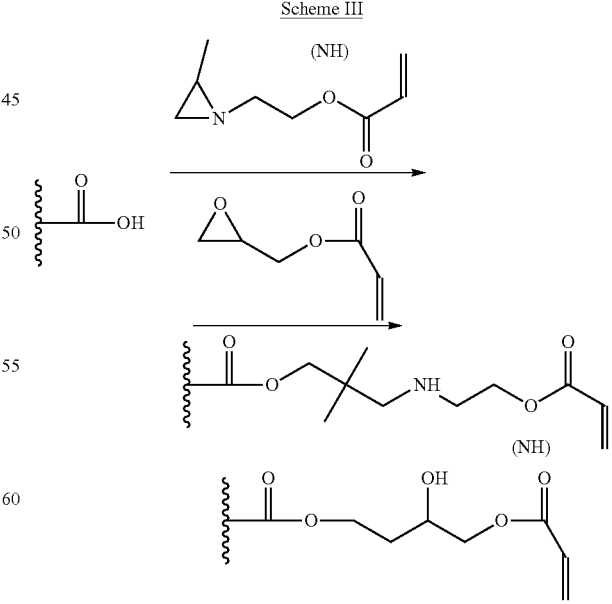

Scheme III

Less preferably, a compound of Formula II is reacted with an aziridine- or epoxy-functional compound to form an intermediate functional group as illustrated in Scheme IV. In the reaction scheme the product is further functionalized to provide the requisite free-radically polymerizable group Z, and the surface modifying groups Y. That is, a portion of the available hydroxyl and/or amino groups are functionalized with a compound of Formula IIIa, and a portion with a compound of Formula IIIb. Alternatively, an epoxy- or aziridine-functional polymer can be further functionalized with a nucleophilic compound of Formulas IIIa or b to produce the compounds of Formula I.

as N-acryloylaziridine and 1-(2-propenyl)-aziridine; and acryloyl halides such as (meth)acryloyl chloride.

Representative hydroxyl group-substituted functional compounds of Formula IIIa include the hydroxyalkyl acrylates and hydroxyalkyl acrylamides such as 2-hydroxyethyl (meth)acrylate, 4-hydroxybutyl(meth)acrylate, 2-hydroxypropyl(meth)acrylate, 3-chloro-2-hydroxypropylmethyl (meth)acrylate, 2-hydroxyethyl(meth)acrylamide, 4-hydroxycyclohexyl(meth)acrylate, 3-acryloyloxyphenol,

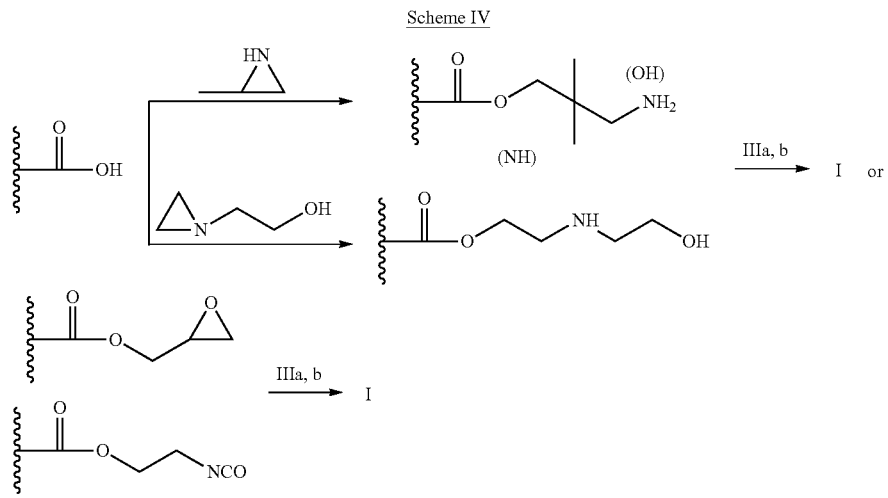

Scheme IV

Useful reactive (and co-reactive) functional groups ($X^2$ and those of Formulas IIIa and b) include hydroxyl, secondary amino, oxazolinyl, oxazolonyl, acetylacetonate, carboxyl, isocyanato, epoxy, aziridinyl, acyl halide, and cyclic anhydride groups. Where the reactive functional group of the (meth)acrylate dimer/trimer is an isocyanato functional group, the co-reactive functional group preferably comprises a primary or secondary amino or hydroxyl group. Where the reactive functional group comprises a hydroxyl group, the co-reactive functional group preferably comprises a carboxyl, ester, acyl halide, isocyanato, epoxy, anhydride, azlactonyl or oxazolinyl group. Where the pendent reactive functional group comprises a carboxyl group, the co-reactive functional group preferably comprises a hydroxyl, amino, epoxy, isocyanate, or oxazolinyl group. Most generally, the reaction is between a nucleophilic and electrophilic functional groups.

Representative examples of useful compounds of Formula IIIa having co-reactive functional groups include hydroxyalkyl(meth)acrylates such as 2-hydroxyethyl(meth)acrylate, 3-hydroxypropyl(meth)acrylate, 2,3-dihydroxypropyl(meth) acrylate, 4-hydroxybutyl(meth)acrylate and 2-(2-hydroxyethoxy)ethyl(meth)acrylate; aminoalkyl(meth)acrylates such as 3-aminopropyl(meth)acrylate and 4-aminostyrene; oxazolinyl compounds such as 2-ethenyl-1,3-oxazolin-5-one, 2-vinyl-4,4-dimethyl-1,3-oxazolin-5-one, 2-isopropenyl-4,4-dimethyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl(meth)acrylate and 4-isocyanatocyclohexyl (meth)acrylate; epoxy-substituted compounds such as glycidyl(meth)acrylate; aziridinyl-substituted compounds such 2-(4-(meth)acryloyloxyphenyl)-2-(4-hydroxyphenyl)propane (also called bisphenol A monoacrylate), 2-propyn-1-ol, and 3-butyn-1-ol.

Representative amino group-substituted functional compounds of Formula IIIa include 2-methyl aminoethyl(meth) acrylate, 3-aminopropyl(meth)acrylate, 4-aminocyclohexyl (meth)acrylate, N-(3-aminophenyl)(meth)acrylamide, N-(meth)acryloylethylenediamine, and 4-aminophenyl-4-acrylamidophenylsulfone.

Representative azlactone group-substituted functional compounds of Formula IIIa include: 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-3-oxa-1-aza[4.5]spirodec-1-ene-4-one; 2-ethenyl-5,6-dihydro-4H-1,3-oxazin-6-one; 2-ethenyl-4,5,6,7-tetrahydro-1,3-oxazepin-7-one; 2-isopropenyl-5,6-dihydro-5,5-di(2-methylphenyl)-4H-1,3-oxazin-6-one; 2-acryloyloxy-1,3-oxazolin-5-one; 2-(2-acryloyloxy)ethyl-4,4-dimethyl-1,3-oxazolin-5-one; 2-ethenyl-4,5-dihydro-6H-1,3-oxazin-6-one; and 2-ethenyl-4,5-dihydro-4,4-dimethyl-6H-1,3-oxazin-6-one.

Representative oxazolinyl group-substituted functional compounds of Formula IIIa include 2-vinyl-2-oxazoline, 2-isopropenyl-2-oxazoline, 2-(5-hexenyl)-2-oxazoline, 2-acryloxy-2-oxazoline, 2-(4-acryloxyphenyl)-2-oxazoline, and 2-methacryloxy-2-oxazoline.

Representative acetoacetyl group-substituted functional compounds of Formula III include 2-(acetoacetoxy)ethyl acrylate.

Representative carboxyl group-substituted functional compounds of Formula IIIa include (meth)acrylic acid, 3-(meth)acryloyloxy-propionic acid, 4-(meth)acryloyloxy-butyric acid, 2-(meth)acryloyloxy-benzoic acid, 3-(meth)acryloyloxy-5-methyl benzoic acid, 4-(meth)acryloyloxymethyl-benzoic acid, phthalic acid mono-[2-(meth)acryloyloxy-ethyl]ester, 2-butynoic acid, and 4-pentynoic acid.

Representative isocyanate group-substituted functional compounds of Formula IIIa include 2-isocyanatoethyl(meth)acrylate, 3-isocyanatopropyl(meth)acrylate, 4-isocyanatocyclohexyl(meth)acrylate, 4-isocyanatostyrene, 2-methyl-2-propenoyl isocyanate, 4-(2-(meth)acryloyloxyethoxycarbonylamino)phenylisocyanate, allyl 2-isocyanatoethylether, and 3-isocyanato-1-propene.

Representative epoxy group-substituted functional compounds of Formula IIIa include glycidyl(meth)acrylate, thioglycidyl(meth)acrylate, 3-(2,3-epoxypropoxy)phenyl (meth)acrylate, 2-[4-(2,3-epoxypropoxy)phenyl]-2-(4-(meth)acryloyloxy-phenyl)propane, 4-(2,3-epoxypropoxy) cyclohexyl(meth)acrylate, 2,3-epoxycyclohexyl(meth) acrylate, and 3,4-epoxycyclohexyl(meth)acrylate.

Representative aziridinyl group-substituted functional compounds of Formula IIIa include N-(meth)acryloylaziridine, 2-(1-aziridinyl)ethyl(meth)acrylate, 4-(1-aziridinyl)butyl acrylate, 2-[2-(1-aziridinyl)ethoxy]ethyl(meth)acrylate, 2-[2-(1-aziridinyl)ethoxycarbonylamino]ethyl(meth)acrylate, 12-[2-(2,2,3,3-tetramethyl-1-aziridinyl)ethoxycarbonylamino]dodecyl(meth)acrylate, and 1-(2-propenyl)aziridine.

Representative acyl halide group-substituted functional compounds of Formula IIIa include (meth)acryloyl chloride, α-chloro(meth)acryloyl chloride, (meth)acryloyloxyacetyl chloride, 5-hexenoyl chloride, 2-(acryloyloxy) propionyl chloride, 3-(acryloylthioxy) propionoyl chloride, and 3-(N-acryloyl-N-methylamino) propionoyl chloride.

Representative anhydride group-substituted functional monomers include maleic anhydride, (meth)acrylic anhydride, itaconic anhydride, 3-(meth)acryloyloxyphthalic anhydride, and 2-(meth)acryloxycyclohexanedicarboxylic acid anhydride.

Preferred ethylenically unsaturated compounds having a reactive functional group ("functional acryl compounds") include hydroxyalkyl acrylates such as 2-hydroxyethyl (meth)acrylate and 2-(2-hydroxyethoxy)ethyl(meth)acrylate; aminoalkyl(meth)acrylates such as 3-aminopropyl (meth)acrylate and 4-aminostyrene; oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl(meth)acrylate and 4-isocyanatocyclohexyl (meth)acrylate; epoxy-substituted compounds such as glycidyl(meth)acrylate; aziridinyl-substituted compounds such as N-acryloylaziridine and 1-(2-propenyl)-aziridine; and acryloyl halides such as (meth)acryloyl chloride.

With respect to Formula IIIb, the reactive group $A^2$ may be selected from those described supra. Y is a surface-modifying group that interacts with a substrate (e.g., the backing of a tape, metal surface, glass, glass cloth, or any surface to which the Y group displays an affinity) on which the curable composition is disposed (i.e., interacting physically or chemically, which can be covalent or ionic, for example. In some embodiments Y is a thiol group (—SH), a monophosphate group, a phosphonate or phosphonic acid group (—P(O)(OH)$_2$), a hydroxamic acid group (—C(O)NHOH), a carboxylic acid group (—C(O)OH), a sulfuric or sulfonic acid group, a phospine group, phenolic groups (including catechols and 1,2,3-trihydroxy benzene derivatives), amines, an isonitrile group, a silyl group, a disulfide group (—S—S—). or a heterocyclic aromatic group (e.g., benzotriazolyl thiazoyl, benzimidaolyl or pyridinyl).

More preferably, Y is a thiol group, a monophosphate group, a phosphonate group, a carboxylic acid group, a silyl group, or a benzotriazole group. For aluminum oxide surfaces, preferably Y includes a phosphonic acid group (—P(O)(OH)$_2$), a hydroxamic acid group (—C(O)NHOH), or a carboxylic acid group (—C(O)OH). For iron oxide or steel substrates, preferably Y includes a hydroxamic acid group (—C(O)NHOH). For copper oxide, preferably Y includes a hydroxamic acid group (—C(O)NHOH), a thiol group (—SH), a monophosphate group, a phosphonate or phosphonic acid group, a triazolyl group, a thiazolyl group, a benzimidazolyl group, or a pyridinyl group. F or silicon oxide or glass, preferably Y is a silyl group of the formula —SiR$^7_3$, wherein each R$^7$ group is independently selected from the group of alkoxy, acetoxy, and halide. For gold, copper, and silver, preferably Y is a thiol group (—SH) or a disulfide group (—S—S—). For platinum, preferably Y includes a pyridinyl or a phosphine group.

It will also be understood that the compounds of Formula II may be provided with other nucleophilic or electrophilic functional groups, in addition to simple esters or amides. With reference to the $X^2$ group of Formula II, which comprises an electrophilic or nucleophilic functional groups, $X^2$ may be selected from —OH, —Cl, —Br, —NR$^4$H, —R$^6$—NCO, —R$^6$—SH, —R$^6$—OH, —R$^6$—NR$^4$H, —R$^6$—Si(OR$^4$)$_3$, —R$^6$-halide, —R$^6$-aziridine, —R$^6$-epoxy, —R$^6$—N$_3$, —R$^6$-anhydride, —R$^6$-succinate, —R$^6$—NR$^4$H, and other electrophilic or nucleophilic functional groups. wherein each R$^6$ is an alkylene group having 1 to 6 carbon atoms, a 5- or 6-membered cycloalkylene group having 5 to 10 carbon atoms, or a divalent aromatic group having 6 to 16 carbon atoms. R$^6$ may be substituted with one or more in-chain functional groups, including ether, amine, thioether, ester, amide, urea, and urethane functional groups, for example R$^6$—NH—CO—O—R$^{6'}$—NCO, where R$^{6'}$ is defined as R$^6$. R$^4$ is H or C$_1$-C$_4$ alkyl.

As previously described, one or more of the R$^1$, R$^2$ and R$^3$ groups may comprise both the polymerizable group "Z" and the surface-modifying group "Y". Illustrative examples of these embodiments include the following structures A to E. It will be apparent that such structures may be prepared by reaction of a (meth)acryloyl compound of Formula II with an epoxy-functional (meth)acrylate of Formula IIIa, such as glycidyl methacrylate, followed by functionalization of the resulting hydroxyl (from ring-opening of the epoxy group) with a diacyl compound or cyclic anhydride for compounds A to C, with POCl$_3$ followed by hydrolysis for compound D, or a silyl-functional isocyanate for compound E.

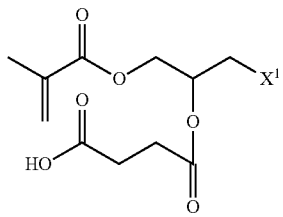

A

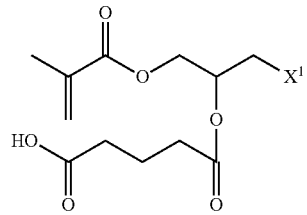

B

-continued

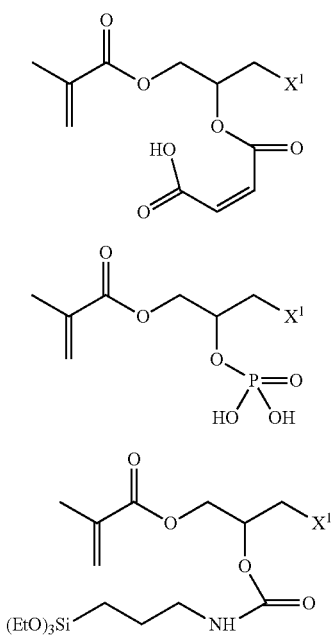

C

D

E

The present disclosure further provides a polymerizable composition comprising the addition-fragmentation agent of Formula I, and at least one polymerizable monomer, such as (meth)acryloyl monomers, including acrylate esters, amides, and acids to produce (meth)acrylate homo- and copolymers. Generally, the addition-fragmentation agent of Formula I is used in amounts of 0.1 to 10 parts by weight, preferably 0.1 to 5 parts by weight, based on 100 parts by weight of total monomer.

The (meth)acrylate ester monomer useful in preparing the (meth)acrylate polymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable source, such as 2-octanol, citronellol, dihydrocitronellol.

In some embodiments it is desirable for the (meth)acrylic acid ester monomer to include a high $T_g$ monomer, having a $T_g$ of at least 25° C., and preferably at least 50° C. Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of up to 100 parts by weight, preferably 85 to 99.5 parts by weight based on 100 parts total monomer content used to prepare the polymer. Preferably (meth)acrylate ester monomer is present in an amount of 90 to 95 parts by weight based on 100 parts total monomer content. When high $T_g$ monomers are included, the copolymer may include up to 30 parts by weight, preferably up to 20 parts by weight of the (meth) acrylate ester monomer component.

The polymer may further comprise an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 1 to 15 parts by weight, most preferably 5 to 10 parts by weight, based on 100 parts by weight total monomer.

The polymer may further comprise a polar monomer. The polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional monomers.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 10 parts by weight, preferably 0.5 to 5 parts by weight, based on 100 parts by weight total monomer.

The polymer may further comprise a vinyl monomer. When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

In order to increase the cohesive strength of the composition, a multifunctional (meth)acrylate may be incorporated into the blend of polymerizable monomers. Multifunctional acrylates are particularly useful for emulsion or syrup polymerization. Examples of useful multifunctional (meth)acrylates include, but are not limited to, di(meth)acrylates, tri(meth)acrylates, and tetra(meth)acrylates, such as 1,6-hexanediol di(meth)acrylate, poly(ethylene glycol)di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinker may be present in amounts from 0.01 to 5 parts, preferably 0.05 to 1 parts, based on 100 parts total monomers of the adhesive composition.

In such embodiments, the copolymer may comprise:
  i. up to 100 parts by weight, preferably 85 to 99.5 parts by weight of an (meth)acrylic acid ester;
  ii. 0 to 15 parts by weight, preferably 0.5 to 15 parts by weight of an acid functional ethylenically unsaturated monomer;
  iii. 0 to 15 parts by weight of a non-acid functional, ethylenically unsaturated polar monomer;
  iv. 0 to 5 parts vinyl monomer;
  v. 0 to 5 parts of a multifunctional (meth)acrylate;
  vi. 0 to 5 parts of a polymerizable photoinitiator.
  based on 100 parts by weight total monomer.

The composition may be polymerized with either a thermal initiator or photoinitiator. Any conventional free radical initiator may be used to generate the initial radical. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™ 67 (2,2'-azo-bis(2-methybutyronitrile)) VAZO™ 64 (2,2'-azo-bis(isobutyronitrile)) and VAZO™ 52 (2,2'-azo-bis(2,2-dimethyvaleronitrile)), and Lucidol™ 70 from Elf Atochem North America, Philadelphia, Pa.

Useful photoinitiators include benzoin ethers such as benzoin methyl ether and benzoin isopropyl ether; substituted acetophenones such as 2,2-dimethoxyacetophenone, available as Irgacure™ 651 photoinitiator (Ciba Specialty Chemicals), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

The initiator is used in an amount effective to facilitate free radical addition to the addition-fragmentation crosslinking agent and the amount will vary depending upon, e.g., the type of initiator and the molecular weight of the polymer and the degree of functionalization desired. The initiators can be used in amounts from about 0.001 part by weight to about 5 parts by weight based on 100 parts total monomer.

The curable composition may also include other additives. Examples of suitable additives include tackifiers (e.g., rosin esters, terpenes, phenols, and aliphatic, aromatic, or mixtures of aliphatic and aromatic synthetic hydrocarbon resins), surfactants, plasticizers (other than physical blowing agents), nucleating agents (e.g., talc, silica, or $TiO_2$), pigments, dyes, reinforcing agents, solid fillers, stabilizers (e.g., UV stabilizers), and combinations thereof. The additives may be added in amounts sufficient to obtain the desired properties for the cured composition being produced. The desired properties are largely dictated by the intended application of the resultant polymeric article.

In some embodiments the crosslinkable composition may include filler. In some embodiments the total amount of filler is at most 50 wt. %, preferably at most 30 wt. %, and more preferably at most 10 wt. % filler. Fillers may be selected from one or more of a wide variety of materials, as known in the art, and include organic and inorganic filler. Inorganic filler particles include silica, submicron silica, zirconia, submicron zirconia, and non-vitreous microparticles of the type described in U.S. Pat. No. 4,503,169 (Randklev).

Filler components include nanosized silica particles, nanosized metal oxide particles, and combinations thereof. Nanofillers are also described in U.S. Pat. No. 7,090,721 (Craig et al.), U.S. Pat. No. 7,090,722 (Budd et al.), U.S. Pat. No. 7,156,911 (Kangas et al.), and U.S. Pat. No. 7,649,029 (Kolb et al.).

In some preferred embodiments, the curable composition comprises nanoparticles and/or nanoclusters surface treated with an organometallic coupling agent to enhance the bond between the filler and the monomers/and/or polymers. The organometallic coupling agent may be functionalized with reactive curing groups, such as acrylates, methacrylates, vinyl groups and the like and may comprise silane, zirconate or titanate coupling agents.

Suitable copolymerizable organometallic compounds may have the general formulas: $CH_2=C(CH_3)_mSi(OR)_nR_{3-n}$ or $CH_2=C(CH_3)_mC=OOR^{21}Si(OR)_nR_{3-n}$; wherein m is 0 or 1, R is an alkyl group having 1 to 4 carbon atoms, $R^{21}$ is a divalent organic linking group, and n is from 1 to 3. Preferred coupling agents include gamma-methacryloxypropyltrimethoxysilane, gamma-mercaptopropyltriethoxysilane, gamma-aminopropyltrimethoxysilane, and the like.

A variety of conventional methods are available for modifying the surface of nanoparticles including, e.g., adding a surface-modifying agent to nanoparticles (e.g., in the form of a powder or a colloidal dispersion) and allowing the surface-modifying agent to react with the nanoparticles. Other useful surface-modification processes are described in, e.g., U.S. Pat. No. 2,801,185 (Iler), U.S. Pat. No. 4,522,958 (Das et al.) U.S. Pat. No. 6,586,483 (Kolb et al.), each incorporated herein by reference.

Surface-modifying groups may be derived from surface-modifying agents. Schematically, surface-modifying agents can be represented by the formula A-B, where the A group is capable of attaching to the surface of the particle (i.e., the silanol groups of a silica particle) and the B group is a reactive or non-reactive functional group. A non-functional group is one does not react with other components in the system (e.g. the substrate). Non-reactive functional groups can be selected to render the particle relatively more polar, relatively less polar or relatively non-polar. In some embodiments the non-reactive functional group "B" is a hydrophilic group such as an acid group (including carboxylate, sulfonate and phosphonate groups), ammonium group or poly(oxyethylene) group, or hydroxyl group. In other embodiments, "B" may be a reactive functional groups such as an ethylenically unsaturated polymerizable group, including vinyl, allyl, vinyloxy, allyloxy, and (meth)acryloyl, that may be free-radically polymerized with the polymerizable resin or monomers.

Such optional surface-modifying agents may be used in amounts such that 0 to 100%, generally 1 to 90% (if present) of the surface functional groups (Si—OH groups) of the silica nanoparticles are functionalized. The number of functional groups is experimentally determined where quantities of nanoparticles are reacted with an excess of surface modifying agent so that all available reactive sites are functionalized with a surface modifying agent. Lower percentages of functionalization may then be calculated from the result. Generally, the amount of surface modifying agent is used in amount sufficient to provide up to twice the equal weight of surface modifying agent relative to the weight of inorganic nanoparticles. When used, the weight ratio of surface modifying agent to inorganic nanoparticles is preferably 2:1 to 1:10. If surface-modified silica nanoparticles are desired, it is preferred to modify the nanoparticles prior to incorporation into the coating composition.

In some preferred embodiments, the fillers, particularly the silica fillers, may be surface modified with the addition-fragmentation agent of Formula I. Thus the present disclosure provides addition-fragmentation monomer-modified filler particles. These surface modified filler particles may be compounded with the polymerizable mixture and cured as described herein, with the result that the filler particles are integrated into the cured composition. With reference to Formula I, the surface-modified particle filler may be illustrated as:

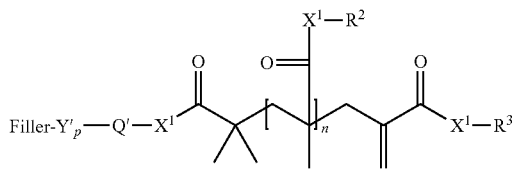

where
Filler is an inorganic filler particle,
$R^2$ and $R^3$ are each independently $Z_m$-Q-, $Y_p$-Q'-, a (hetero)alkyl group or a (hetero)aryl group;
Q is a covalent bond or a linking group, preferably an organic (hetero)hydrocarbyl linking group having a valence of m+1;
Q' is a covalent bond or an or a linking group, preferably an organic (hetero)hydrocarbyl linking group having a valence of p+1;
Z is an ethylenically unsaturated polymerizable group,
Y' is the residue of the surface-modifying organic functional group that associates with a substrate on which the addition-fragmentation agent is disposed;
m is 1 to 6;
p is 1 or 2;
$X^1$ is independently —O— or —$NR^4$—, where $R^4$ is H or $C_1$-$C_4$ alkyl, and
n is 0 or 1.
It will be understood in the above Formula that the $R^1$ group of formula I was chosen with the "Y-Q'-" surface modifying group and that any of $R^1$, $R^2$ and/or $R^3$ could be illustrated. It will be further understood that each of $R^1$, $R^2$ and $R^3$ may contain both a $Z_m$-Q- and a $Y_p$-Q'- group, i.e. both the polymerizable group and the surface-modifying group are part of the same "R" group.

As used herein the term "residue" is used to define that portion of a functional group remaining reaction of the functional group with the surface of the inorganic particulate For example, the "residue" of a silane functional group Y of the formula —$SiR^7_3$ would be —O—$Si(R^7)_2$—.

For further illustration, the particular filler may be selected from silica (or a silica composite), and the surface-modifying organic functional group "Y" may be selected from a silyl group of the formula —$SiR^7_3$, wherein each $R^7$ group is independently selected from the group of alkoxy, acetoxy, and halide. This would result in a covalent bond between the silica particle and the addition fragmentation agent illustrated by a Silica-O—$Si(R^7)_2$— linkage. It will be understood that the silyl moiety may form one (as illustrated) or more siloxane bonds with a silica particle or siloxane bonds with othyl sily groups. With reference to formula I, one may selected Y=hydroxamic acid or N-hydroxyurea that may bond to zirconia, a filler used in high index coatings/films as well as in dental composites, Y=phosphates and phosphonates would also be useful for alumina fillers, and Y=thiols for gold.

In general, all or a part of the surface functional groups of an inorganic filler particle may be so modified by the addition-fragmentation agent of Formula I. The fillers may be unmodified, surface modified by conventional surface-modifying agents, surface-modifying agent of Formula I, or a mixture of conventional surface-modifying agents and those of Formula I. Preferably, the addition-fragmentation agent is used in amounts of 0.5 to 10 wt. %, relative to the weight of the filler particles.

The surface modification can be done either subsequent to mixing with the polymerizable monomers or after mixing. It is typically preferred to combine the organosilane surface treatment compounds with nanoparticles before incorporation into the resin. The required amount of surface modifier is dependent upon several factors such as particle size, particle type, modifier molecular wt, and modifier type. In general it is preferred that approximately a monolayer of modifier is attached to the surface of the particle.

The present addition fragmentation agents are also useful in the preparation of hardcoats. The term "hardcoat" or "hardcoat layer" means a layer or coating that is located on the external surface of an object, where the layer or coating has been designed to at least protect the object from abrasion. The present disclosure provides hardcoat compositions comprising the addition-fragmentation agent of Formula I and, a multi-functional (moth)acrylate monomer comprising three or more (meth)acrylate groups, and/or a multi-functional (meth)acrylate oligomer and optionally a (meth)acrylate-functional diluent.

Useful multifunctional (meth)acrylate monomers comprise three or more (meth)acrylate groups. Multifunctional (meth)acrylate monomers are useful in the practice of the present invention because they add abrasion resistance to the hard coat layer. Preferred multifunctional (meth)acrylate monomers comprising three or more (meth)acrylate groups include trimethylol propane tri(meth)acrylate (TMPTA), pentaerythritol tri(meth)acrylate, pentaerythritol tetra(meth)acrylate, ditrimethylolpropane tri(meth)acrylate (Sartomer 355), dipentaerythritol penta(meth)acrylate (Sartomer 399), dipentaerythritol hydroxy penta(meth)acrylate (DPHPA), glyceryl propoxy tri(meth)acrylate, trimethyllopropane tri(meth)acrylate, and mixtures thereofnother useful radiation-curable component of the present invention is the class of multifunctional (meth)acrylate oligomers, having two or more (meth)acrylate groups, and having an average molecular weight (Mw) in the range from about 400 to 2000.

Useful multi-functional (meth)acrylate oligomers include polyester (meth)acrylates, polyurethane (meth)acrylates, and (meth)acrylated epoxy(meth)acrylates. (Meth)acrylated epoxy(meth)acrylates and polyester(meth)acrylates are most preferred because they tend to have a relatively low viscosity and therefore allow a I I more uniform layer to be applied by the spin coating method. Specifically, preferred multifunctional (meth)acrylate oligomers include those commercially available from UCB Radcure, Inc. of Smyrna, Ga. and sold under the trade name Ebecryl (Eb): Eb4O (tetrafunctional acrylated polyester oligomer), ENO (polyester tetrafunctional (meth)acrylate oligomer), Eb8 I (multifunctional (meth)acrylated polyester oligomer), Eb6OO (bisphenol A epoxy di(meth)acrylate), Eb6O5 (bisphenol A epoxy di(meth)acrylate diluted with 25% tripropylene glycol di(meth)acrylate), Eb639 (novolac polyester oligomer), Eb2O47 (trifunctional acrylated polyester oligomer), Eb3500 (di-functional Bisphenol-A oligomer acrylate), Eb3604 (multi-functional polyester oligomer acrylate), Eb6602 (trifunctional aromatic urethane acrylate oligomer), Eb8301 (hexafunctional aliphatic urethane acrylate), EbW2 (difunctional aliphatic urethane acrylate oligomer), and mixtures thereof. Of these, the most preferred are, Eb 600, Eb6O5, Eb80, and Eb81.

THe (meth)acrylate-functional diluents, also referred to herein as "reactive diluents," are relatively low molecular weight mono- or di-functional, non-aromatic, (meth)acrylate monomers. These relatively low molecular weight reactive diluents are advantageously of a relatively low viscosity, e.g., less than about 30 centipoise (cps) at 25 C. Di-functional, non-aromatic (meth)acrylates are generally preferred over mono-functional non-aromatic (meth)acrylates because di-functional non-aromatic (meth)acrylates allow for quicker cure time. Preferred reactive diluents include 1,6-hexanediol di(meth)acrylate (HDODA from UCB Radcure, Inc. of Smyrna, Ga.), tripropylene glycol di(meth)acrylate, isobornyl(meth)acrylate (1130A, Radcure), 2(2-ethoxyethoxy)ethyl(meth)acrylate (sold under the trade name Sartomer 256 from SARTOMER Company, Inc. of Exton, Pa.), n-vinyl formamide (Sartomer 497), tetrahydrofurfuryl(meth)acrylate (Sartomer 285), polyethylene glycol di(meth)acrylate (Sartomer 344), tripropylene glycol di(meth)acrylate (Radcure), neopentyl glycol dialkoxy di(meth)acrylate, polyethyleneglycol di(meth)acrylate, and mixtures thereof.

The hardcoat composition may comprise:

(0.1-10 wt. % of the AFM and/or AFM-modified silica, the weight percents referring to the AFM per se, whether as a functionalized filler or not (0.1-10 wt. % AFM)

20-75 wt. % of Multifunctional (meth)acrylate monomers and/or multifunctional (meth)acrylate oligomers, 0 to 25 wt. % range of (meth)acrylate diluent, (0-25 wt. %)

20 to 75 wt. % of silica. (20-75 wt. %), the weight ranges referring to the silica per se, whether or not functionalized.

In some embodiments the amount of silica, including the AFM surface modified silica, silica modified with conventional surface modifying agents and unmodified silica is 20-75 wt. %, preferably 50-70 wt. %.

The addition fragmentation agents are also useful in preparing dental compositions as described in Applicant's copending application titled "Dental Compositions Comprising Addition-Fragmentation Agent", U.S. Ser. No. 61/526,437, filed 23 Aug. 2011, incorporated by reference in its' entirety.

EXAMPLES

All percentages and ratios are by weight unless otherwise specified.

Test Methods

Watts Shrinkage Test Method

The Watts Shrinkage (Watts) Test Method measures shrinkage of a sample test composition by the volumetric change after curing. The sample preparation (90-mg uncured test sample composition) and test procedure were carried out as described in the following reference: Determination of Polymerization Shrinkage Kinetics in Visible-Light-Cured Materials: Methods Development, Dental Materials, October 1991, pages 281-286. The results are reported as negative % shrinkage.

Diametral Tensile Strength (DTS) Test Method

Diametral tensile strength of a cured composition was measured in this test. An uncured test sample composition was injected into a 4-mm (inside diameter) glass tube and the tube was capped with silicone rubber plugs. The tube was compressed axially at approximately 2.88 kg/cm$^2$ pressure for 5 minutes. The sample was then light cured for 80 seconds by exposure to a XL 1500 dental curing light (3M ESPE, St. Paul, Minn.), followed by irradiation for 90 seconds in a Kulzer UniXS curing box (Heraeus Kulzer GmbH, Germany). The test sample was cut with a diamond saw to form disks about 2 mm thick, which were stored in distilled water at 37° C. for about 24 hours prior to testing. Measurements were carried out on an Instron tester (Instron 4505, Instron Corp., Canton, Mass.) with a 10 kilonewton (kN) load cell at a crosshead speed of 1 mm/minute according to ISO Specification 7489 (or American Dental Association (ADA) Specification No. 27). Test results were reported in MPa (megapascals) as the average of multiple measurements.

Stress Test Method

The Stress Test Method measures the stress development during the curing process of a test sample composition. An 8×2.5×2 mm slot was machined in a rectangular 15×8×8 mm aluminum block to form a test fixture for each test sample. The slot was located 2 mm along an edge, thus forming a 2 mm wide aluminum cusp adjacent to and parallel to the 2 mm wide cavity containing compositions to be tested. A linear variable displacement transducer (Model GT 1000, used with an E309 analog amplifier, both from RDP Electronics, United Kingdom) was positioned so as to measure the displacement of the cusp tip as the composition photocured at room temperature. Prior to testing, the slot in the aluminum block was sandblasted using Rocatec Plus Special Surface Coating Blasting Material (3M ESPE, St. Paul, Minn.), treated with RelyX Ceramic Primer (3M ESPE), and finally treated with a dental adhesive, Adper Easy Bond (3M ESPE). The slot was fully packed with approximately 100 mg of the sample compositions. The material was irradiated for 1 minute with a dental curing lamp (Elipar S-10, 3M ESPE) positioned almost in contact (<1 mm) with the material in the slot, then the displacement of the cusp in microns was recorded 9 minutes after the lamp was extinguished.

Depth of Cure Test Method

The depth of cure (DOC) was measured for a test sample composition after curing. A test fixture with an open 8 millimeter stainless steel mold cavity was placed on a polyester film and filled with the sample composition. A second polyester film placed atop the resin and fixture was pressed to provide a level surface on the composition. The filled test fixture was placed on a white background surface and the composition was irradiated for 20 seconds using a dental curing light (3M Dental Products Curing Light 2500 or 3M ESPE Elipar FreeLight2, all made by 3M ESPE Dental Products). After curing, the sample removed was from the mold and the uncured resin was gently removed, e.g., gently scraping materials from the bottom of the sample which was the side that was not irradiated with the curing light. The thickness of the remaining cured material was measured. The reported depths are the actual cured thickness in millimeters divided by 2.

Overlap Shear Test

The overlap shear strength was tested using aluminum test coupons measuring 1×4×1/16 inch (2.54×10.2×0.159 cm). Approximately 2.54 cm of the bonding surface of the coupon was abraded with an abrasive pad (Scotch-Brite Heavy Duty Scour Pad, 3M Company; St. Paul, Minn., USA). The coupon was then cleaned by squirting methyl ethyl ketone (MEK) on the coupon on a paper towel and wiping off the MEK with paper towels. Three coupons were prepared for each test adhesive sample.

An adhesive test sample was prepared by mixing the adhesive composition and dispensing 4 lines of adhesive onto the abraded area such that the adhesive covers a 2.54×1.27 cm area. Spacer beads (3-5 mil (0.0762-0.127 mm) diameter beads (Class VI Soda Lime Glass Sphere beads, MO-SCI Specialty Products; Rolla, Mo., USA) were sprinkled over the adhesive surface. A second coupon was placed over the adhesive such that the adhesive overlap was 2.54 cm×1.27 cm×0.127 mm, and the free ends of the coupons extend in opposite direction. A binder clip was placed over the overlapping portions of the coupons and a second binder clip was placed on the other end of the coupons. The adhesive test sample was allowed to cure 5-7 days at room temperature.

The test was conducted on a tensile testing device with a 5625 lb load cell at a rate of 0.1 inch per minute. The force at failure was recorded in pounds per square inch and reported in megapascals (MPa). Tensile testing devices are available under the trade designations Insight 30 MTS or Sintech 5/GL, from MTS Systems Corporation, Eden Prairie, Minn., USA.

Adhesive Handling Test

The handling of an adhesive composition is evaluated by the wet out of the adhesive on a substrate, and the work life, i.e., how long an adhesive can be worked before gelling and curing. An adhesive test sample was prepared by dispensing 12 dots of (approximately 1.8 cm in diameter) of the adhesive in a row on an 8×2 inch (20.3×5.08 cm) high density polyethylene (HDPE) test coupon. Spacer beads (see Overlap Shear Test) were sprinkled onto the entire adhesive surface of each dot and glass microscope slide coverslips were pressed down over the first 2 dots while a stopwatch was started. After 5 minutes, coverslips were pressed onto the next to dots. This process was continued until all of the dots were covered. The Wet Out Time is reported in minutes as last the time in which the adhesive wets the coverslip sufficiently to create a bond, e.g., if the adhesive wets to the edges of the coverslip at 10 minutes, but not at 15, the Wet Out Time is reported as 10 minutes.

The Work Life of each adhesive was evaluated by gently twisting the coverslip with a wooden applicator stick at one minute intervals starting with the first 2 dots. The Work Life is reported as the time when the coverslip can no longer be moved by the stick.

Adhesive Curing Stress Test

The curing stress that a structural adhesive undergoes during polymerization was evaluated by measuring the deformation of the adhesive on an aluminum shim after curing. A greater curl measurement indicates greater stress in the cured adhesive. The testing procedure and apparatus are described in U.S. patent application Ser. No. 13/169,306, filed Feb. 11, 2012.

Materials—Commercial reagents were used as received from the vendor 1,2-epoxy-3-phenoxypropane—TCI America, Portland, Oreg., USA 1,2-epoxydecane—from TCI America, Portland, Oreg., USA 2-Isocyantoethyl methacrylate—TCI America, Portland, Oreg., USA 2,6-di-t-butyl-4-methylphenol—Alfa Aesar, Ward Hill, Mass., USA 2-[(methylsulfonyl)oxyethyl]2-methylacrylate—prepared by the procedure reported by M. J. Benes and J. Peska in Collect. Czech. Chem. Commun., 1983, 48, 3065-3070

3-isocyanatopropyltriethoxysilane—Sigma Aldrich, St. Louis, Mo., USA 3-mercaptopropyl)triethoxysilane—Alfa Aesar 3-mercaptopropyl)trimethoxysilane—Alfa Aesar 4-(dimethylamino)pyridine—Alfa Aesar, Ward Hill, Mass., USA 4-hydroxybutyl acrylate glycidylether—Nippon Kasei Chemical, Tokyo, Japan 4-vinylbenzyl chloride—Aldrich, Milwaukee, Wis.

Acryloyl chloride—Sigma Aldrich, St. Louis, Mo., USA

Aerosil 200 silica—Degussa Corporation, Piscataway, N.J., USA

Ammonium hydroxide solution—30% solution—Sigma Aldrich

Benzotriazole—Sigma-Aldrich

BHT—butylated hydroxytoluene, Sigma-Aldrich, Milwaukee, Wis., USA

Bis-EMA-6—Sartomer CD541 (ethoxylated (6 mole ethylene oxide) bisphenol A dimethacrylate, Union Carbide; Piscataway, N.J.

BisGMA—(2,2-Bis[4-(2-hydroxy-3-methacryloyloxypropoxy)phenyl]propane, Sigma Aldrich Caprolactone—Alfa Aesar, Heysham, Lane, England Carbon disulfide—EMD Chemicals, Gibbstown, N.J.

CPQ—camphorquinone, Sigma-Alrich

Dibutyltin dilaurate—Alfa Aesar, Ward Hill, Mass., USA

Dichloromethane—EMD Chemicals Inc., Gibbstown, N.J., USA

DPIHFP—Diphenyliodonium hexafluorophosphate (≥98%), Sigma-Aldrich

DMAEMA—2-N,N-dimethylaminoethyl methacrylate, Sigma-Aldrich

DMAP—4-N,N-dimethylaminopyridine, Alfa Aesar, Ward Hill, Mass., USA

DP807 adhesive—2-part curable acrylic resin; 3M Scotch-Weld™ Acrylic Adhesive Resin DP807 Duo-pak, 3M Company; St. Paul, Minn.

EDMAB—Ethyl 4-N,N-dimethylamino benzoate, Sigma-Aldrich

ENMP—ethyl N-methyl-N-phenyl-3-aminopropionate photoinitiator, CAS No. 2003-76-1; this is the compound of Formula 1-a in U.S. Pat. Appl. No. 2010-0311858 (Holmes) The compound may be synthesized by the methods described by Adamson, et al., JCSOA9; J. Chem. Soc.; 1949; spl. 144, 152, which is incorporated herein by reference.

Ethanol—Pharmaco-AAPER, Brookfield, Conn., USA

Ethyl acetate—EMD Chemicals Inc., Gibbstown, N.J., USA

GF-31 Silane (3-Methacryloxypropyltrimethoxysilane, Wacker Chemie AG, Munich, Germany)

Glutaric anhydride—Alfa Aesar, Ward Hill, Mass., USA
Glycidyl acrylate—Polysciences Inc., Warrington, Pa., USA
Glycidyl methacrylate—Alfa Aesar, Ward Hill, Mass., USA
HEMA—Hydyroxyethyl methacrylate, Sigma-Aldrich
Irgacure™ 651 photoinitiator obtained from Ciba Specialty Chemicals.
Irgacure™ 819 photoinitiator—BASF Corporation, Ludwigshafen, Germany
Lucirin TPO (2,4,6-Trimethylbenzoyldiphenylphosphine oxide, Polysciences, Inc, Warrington, Pa., USA)
Maleic anhydride—Avocado Research Chemicals, Ltd., Lancashire, England
Methacryloyl chloride—Alfa Aesar, Ward Hill, Mass., USA
Methoxy propanol—J. T. Baker (Mallinkrodt)
Methylene chloride—Sigma Aldrich
MHP—6-methacryloyloxyhexyl phosphate—compound preparation described in U.S. Patent Publication No. 2009-0011388 (Craig, et al.)
Nalco 2329k-41.33 wt % 20 nanometer nanosilica methoxy propanol; Nalco Company; Naperville, Ill.
Nanozirconia filler—silane-treated nanozirconia powder was prepared as described in U.S. Pat. No. 7,156,911, Preparatory Example 1A except that SILQUEST A-174 silane was used instead of SILQUEST A-1230. The SILQUEST A-174 was charged at approximately 1.2 millimole silane/g oxide.
Nanosilica filler (also referred to as 20 nm silica)—silane-treated nanosilica powder, with a nominal particle size of 20 nm; prepared as described in U.S. Pat. No. 6,572,693 (column 21, lines 63-67 for nanosized particle filler, Type #2)
Particle A (85 m²/g silica/zirconia nanocluster)—aggregated particle cluster material prepared as described generally in U.S. Pat. No. 6,730,156, Preparatory Example A. The material had a surface area of 85 m²/g, and a weight ratio of silica/zirconia of 73/27. Preparation of the material is more specifically described in U.S. Patent application No. 20110196062, Fillers and Composite Materials with Zirconia and Silica Nanoparticles, (Bradley) paragraphs [0067]-[0073], filed Oct. 9, 2009, and references therein (namely, U.S. Pat. No. 6,376,590 (Kolb, et al.), filed on Oct. 28, 1999, or U.S. Pat. No. 7,429,422 (Davidson et al.), filed Jun. 7, 2007,) each of which is hereby incorporated by reference.
Particle B (125 m²/g silica/zirconia nanocluster)—aggregate powder material prepared in the same manner as Particle A, except that the particles had a surface area of 125 m²/g. The particle ratio is 73/27 by weight silica/zirconia.
PEG 600 DMA—Polyethylene Glycol Dimethacrylate (CAS No. 25852-47-5), Sigma Aldrich
Pentaerythritol triacrylate was obtained from Sartomer USA, LLC; Exton, Pa.
Petroleum ether—EMD Chemicals Inc., Gibbstown, N.J., USA
Phosphorus pentoxide ($P_4O_{10}$)—Alfa Aesar, Ward Hill, Mass., USA
Prostab—hydroxy TEMPO, Sigma Aldrich; St. Louis, Mo. USA
Pyridine—Alfa Aesar, Heysham, Lane, England
SILQUEST A-174 silane—Momentive™ Performance Materials, Albany, N.Y., USA
Sodium hydride—60% dispersion in oil, Alfa Aesar, Ward Hill, Mass.
Succinic anhydride—Alfa Aesar, Ward Hill, Mass., USA
TEGDMA—Triethyleneglycol dimethacrylate, TCI America, Portland, Oreg., USA
Tetrahydrofuran—EMD Chemicals Inc., Gibbstown, N.J., USA
Tin(II)octanoate—Alfa Aesar, Heysham, Lane, England
Toluene—EMD Chemicals Inc., Gibbstown, N.J., USA
Triethyl amine—Sigma Aldrich, St. Louis, Mo., USA
Trimellitic acid anhydride chloride—TCI, Portland, Oreg., USA
Triphenyl antimony—Sigma Aldrich, St. Louis, Mo., USA
Triphenyl phosphine—Alfa Aesar, Ward Hill, Mass., USA
UDMA—Rohamere™ 6661-0 (diurethane dimethacrylate, CAS No. 41 137-60-4), Rohm Tech, Inc., Maiden, Mass.
VBCP—reaction product of a copolymer of acrylic acid and itaconic acid with 2-isocyanatoetyl methacrylate prepared as described in U.S. Pat. No. 5,130,347.
Z250—Filtek™Z250 Universal Restorative—3M ESPE
Instrumentation—Nuclear magnetic resonance spectra (proton—1H NMR; carbon—13C; phosphorus—31P NMR) were analyzed and recorded using an NMR spectrometer (UltraShield™ Plus 400 MHz NMR spectrometer; Bruker Corporation; Billerica, Mass.).

Distillation of Methyl Methacrylate Oligomer Mixture

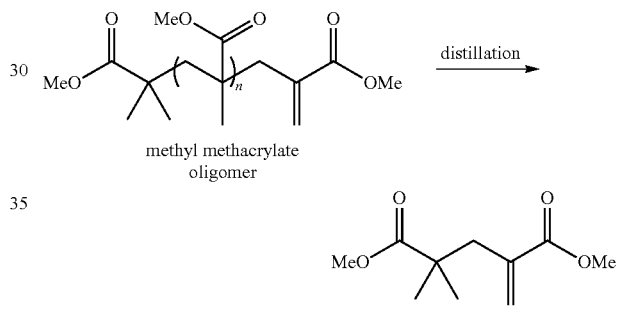

methyl methacrylate oligomer

A methyl methacrylate oligomer mixture was prepared according to the procedure described in Example 1 of U.S. Pat. No. 4,547,323 (Carlson, G. M.). The mixture was distilled as described in Moad, C. L.; Moad, G.; Rizzardo, E.; and Thang, S. H. *Macromolecules*, 1996, 29, 7717-7726, with details as follows:

A 1 liter round-bottomed flask equipped with a magnetic stir bar was charged with 500 g of the methyl methacrylate oligomer mixture. The flask was fitted with a Vigreux column, a condenser, a distribution adapter, and four collection flasks. The distillation apparatus was placed under reduced pressure (0.25 mm Hg) at room temperature and stirred continuously until gas evolution (indicating removal of methyl methacrylate monomer) had largely subsided. The flask was then heated to reflux in an oil bath to distill the oligomer mixture. The fractions isolated by this procedure are listed in Table 1

TABLE 1

Fractions from the Distillation of Methyl Methacrylate Oligomer Mixture

| Fraction | Pressure (mmHg) | Boiling point (° C.) | Mass (g) | Approximate Composition |
|---|---|---|---|---|
| A | 0.25 | 59 | 63.27 | Dimer |
| B | 0.09 | 47 | 115.97 | Dimer |
| C | 0.10 | 60-87 | 25.40 | dimer (~50-75%), oligomers (mainly trimer) |

TABLE 1-continued

Fractions from the Distillation of Methyl Methacrylate Oligomer Mixture

| Fraction | Pressure (mmHg) | Boiling point (° C.) | Mass (g) | Approximate Composition |
|---|---|---|---|---|
| D | 0.10 | 87 | 15.20 | dimer (~5%), oligomers (mainly trimer) |
| E | 0.13 | 105 | 156.66 | oligomers (trimer and higher) |

Hydrolysis of Methyl Methacrylate Dimer

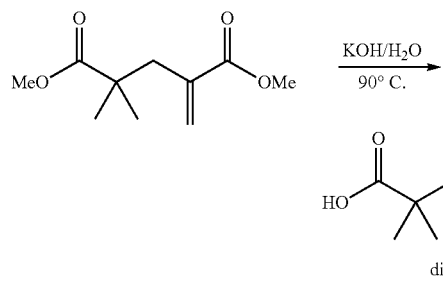

The dimer from Fraction B was hydrolyzed to diacid 1 as described in Hutson, L.; Krstina, J.; Moad, G.; Morrow, G. R.; Postma, A.; Rizzardo, E.; and Thang, S. H. *Macromolecules*, 2004, 37, 4441-4452, with details as follows:

A 1 liter, round-bottomed flask equipped with a magnetic stir bar was charged with deionized water (240 ml) and potassium hydroxide (60.0 g, 1007 millimole). The mixture was stirred until homogeneous. Methyl methacrylate dimer (75.0 g, 374.6 millimole) from Fraction B) was added. The flask, equipped with a reflux condenser, was heated to 90° C. in an oil bath. After 17 hours, the flask was removed from the oil bath and allowed to cool to room temperature. The reaction solution was acidified to pH of approximately 1 by adding concentrated HCl. A white precipitate formed upon acidification. The heterogeneous mixture was vacuum filtered and quickly washed twice with 50-100 ml of deionized water. The white solid was dried by pulling air through the solid for approximately 4 hours. The white solid was then dissolved in approximately 1750 ml of dichloromethane. Less than 1 gram of solid remained insoluble. The solution was allowed to stand for 24 hours and then vacuum filtered to remove the undissolved white solid. The filtered dichloromethane solution was concentrated in vacuum to provide a white solid. The solid was further dried under high vacuum to provide diacid 1 (55.95 g, 325.0 millimole, 87%) as a white powder.

Preparation of AFM-1

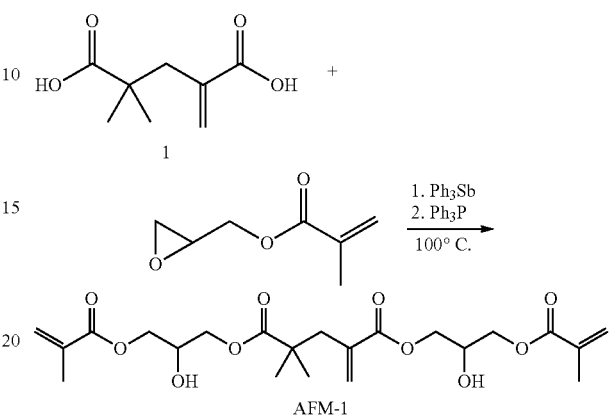

An approximately 250 ml amber bottle equipped with a magnetic stir bar was charged with glycidyl methacrylate (23.0 ml, 24.8 g, 174 millimole) and triphenyl antimony (0.369 g, 1.04 millimole). The bottle was covered with a plastic cap with two 16 gauge needles pierced through the cap and remained in the cap which to allowed air into the reaction. The mixture was heated to 100° C. in an oil bath while stirring. Diacid 1 (15.0 g, 87.1 millimole) was added to the reaction in small portions over a period of 1.5 hours. After 21 hours, triphenyl phosphine (0.091 g, 0.35 millimole) was added. The reaction was stirred at 100° C. for an additional 6.5 hours. A sample from the reaction mixture at this point was analyzed and 1H NMR analysis confirmed the structure of AFM-1 as a mixture of isomers, and also indicated consumption of glycidyl methacrylate. The reaction was cooled to room temperature to provide AFM-1 as a clear, very pale yellow viscous material.

Example 1

Preparation of AFM-Glutarate

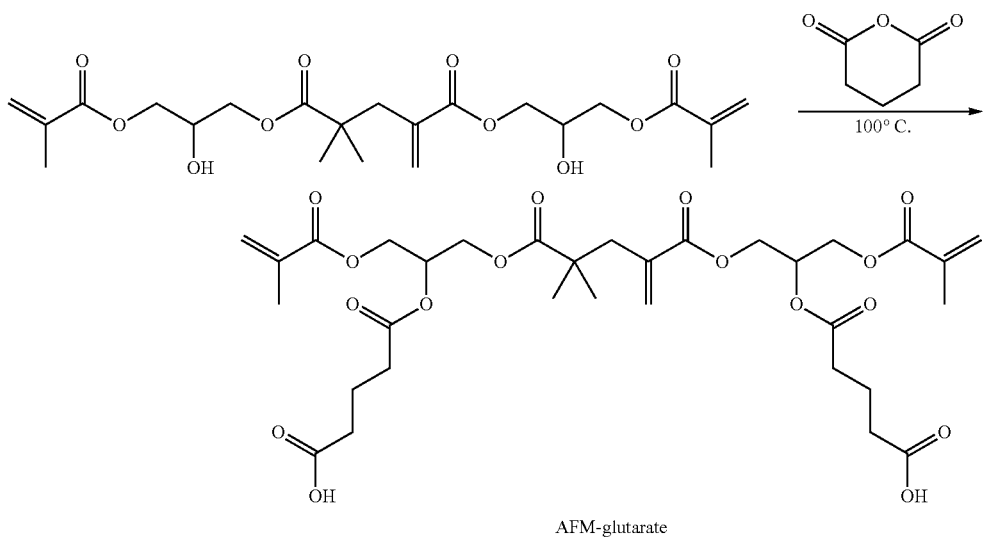

AFM-glutarate

An approximately 25 ml amber bottle equipped with a magnetic stir bar was charged with AFM-1 (5.00 g, 10.95 millimole) and glutaric anhydride (2.50 g, 21.91 millimole). The bottle was covered with a piece of aluminum foil with three small holes to vent the reaction to air. The reaction was heated to 100° C. with stirring. After 25.25 hours, the reaction was cooled to room temperature and sampled. A small amount of glutaric acid remained according to $^1$H NMR analysis. The reaction was heated back 100° C. with stirring. After an additional 24 hours, the reaction was cooled to room temperature. $^1$H NMR analysis confirmed the structure AFM-glutarate as a mixture of isomers. AFM-glutarate (7.39 g, 10.8 millimole, 99%) was obtained as a very viscous, very pale yellow oil.

Example 2

Preparation of AFM-Phosphate

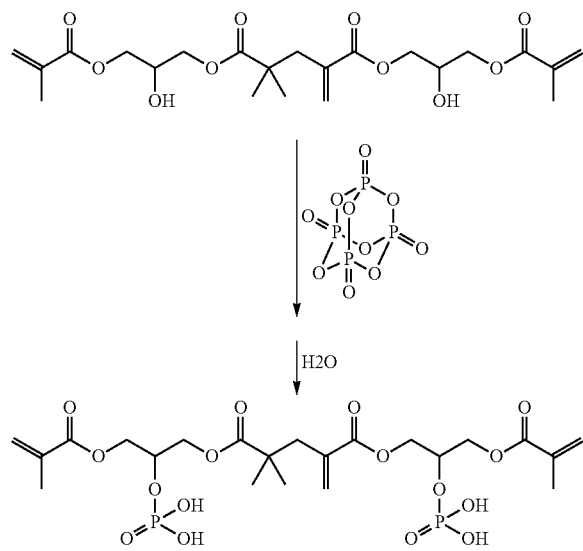

Phosphorus pentoxide (2.06 g, 0.00725 mole) was suspended in dichloromethane in a glass jar equipped with a magnetic stirring bar. AFM-1 (6.6 g, 0.0144 mol) was added and the mixture was stirred at room temperature for 4 hours. Water (0.25 g, 0.014 mole) was then added and the mixture became clear, leaving a small amount of insoluble residue separated at the bottom of the jar. Stirring was continued for 3 hours, and then the mixture was left at room temperature undisturbed overnight. The clear part of the mixture on top was decanted into a round bottom flask followed by solvent removal in a rotary evaporator to provide a clear pale yellow viscous liquid. Yield of the reaction was 85%. The structure of product was confirmed by 1H and 31P NMR.

Example 3

Preparation of AFM-Succinate

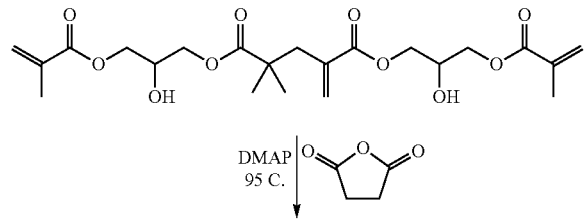

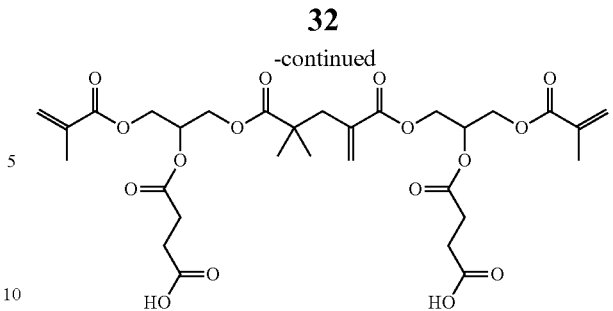

AFM-1 (5.95 g, 0.013 mol), succinic anhydride (2.55 g, 0.255 mol) DMAP (80 mg) BHT (8 mg) were charged into a 50 mL round-bottom flask equipped with a magnetic stirring bar and a dry air blanket. The flask was heated in an oil bath at 95-100° C. with continuous stirring for 5 hours. The heat was turned off and the product was collected with essentially 100% yield as a clear light yellow liquid. The structure of AFM-succinate was confirmed by 1H and 13C NMR.

Example 4

Preparation of AFM-Maleate

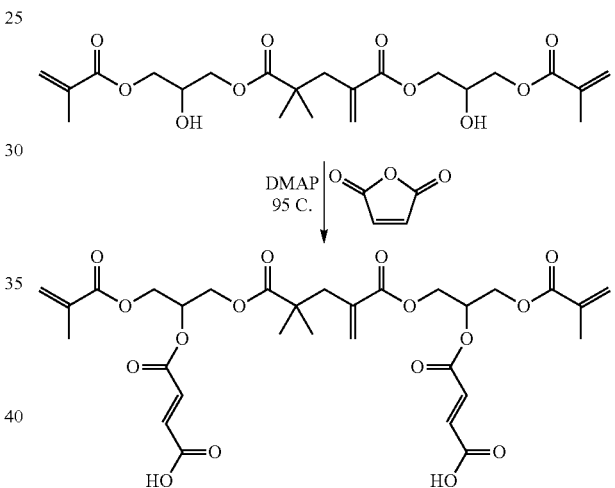

AFM-maleate was prepared from AFM-1 (6.6 g, 0.0145 mol) and maleic anhydride (Avocado Research Chemicals, Ltd, Lancashire, England) (2.8 g, 0.028 mol) in a similar procedure used for the preparing the AFM-succinate. The yield of the reaction was essentially 100%. AFM-maleate was isolated as a clear red-colored liquid and the structure was confirmed by 1H and 13C NMR.

Examples 5-7, Control Example C1

Compositions with AFM Materials

Compositions were prepared by mixing the materials shown in Table 2 using the acidic AFMs of Examples 2-4 as shown. The values are in percent by weight. A Control composition C1 was prepared with MHP in place of the AFM materials.

The compositions were tested for curing and stress relief by painting each resin onto a strip of paper, blow drying with an air gun and then curing for 80 seconds using a 3M Curing Light XL3000 (3M Company; St. Paul, Minn.).

All of the compositions cured to a solid film indicating sufficient cure. Examples 5-7 remained flat after curing while the Control curled. The flatness was attributed to the addition of the acidic AFMs as stress relievers.

TABLE 2

| Component | Compositions in Percent By Weight | | | |
|---|---|---|---|---|
| | Ex C1 | Ex 5 | Ex 6 | Ex 7 |
| BHT | 0.1 | 0.1 | 0.1 | 0.1 |
| EDMAB | 0.97 | 0.97 | 0.97 | 0.97 |
| CPQ | 1.55 | 1.55 | 1.55 | 1.55 |
| Lucirin TPO | 2.31 | 2.31 | 2.31 | 2.31 |
| VBCP | 3.18 | 3.18 | 3.18 | 3.18 |
| HEMA | 22.26 | 22.26 | 22.26 | 22.26 |
| BisGMA | 18.6 | 18.6 | 18.6 | 18.6 |
| DMAEMA | 2.44 | 2.44 | 2.44 | 2.44 |
| MHP | 15.15 | | | |
| AFM-phosphate | | 15.15 | | |
| AFM-succinate | | | 15.15 | |
| AFM-maleate | | | | 15.15 |
| Water | 10.62 | 10.62 | 10.62 | 10.62 |
| Ethanol | 12.55 | 12.55 | 12.55 | 12.55 |
| Aerosil 200 | 7.72 | 7.72 | 7.72 | 7.72 |
| Silane GF31 | 2.55 | 2.55 | 2.55 | 2.55 |

Example 8

Preparation of AFM-Silane

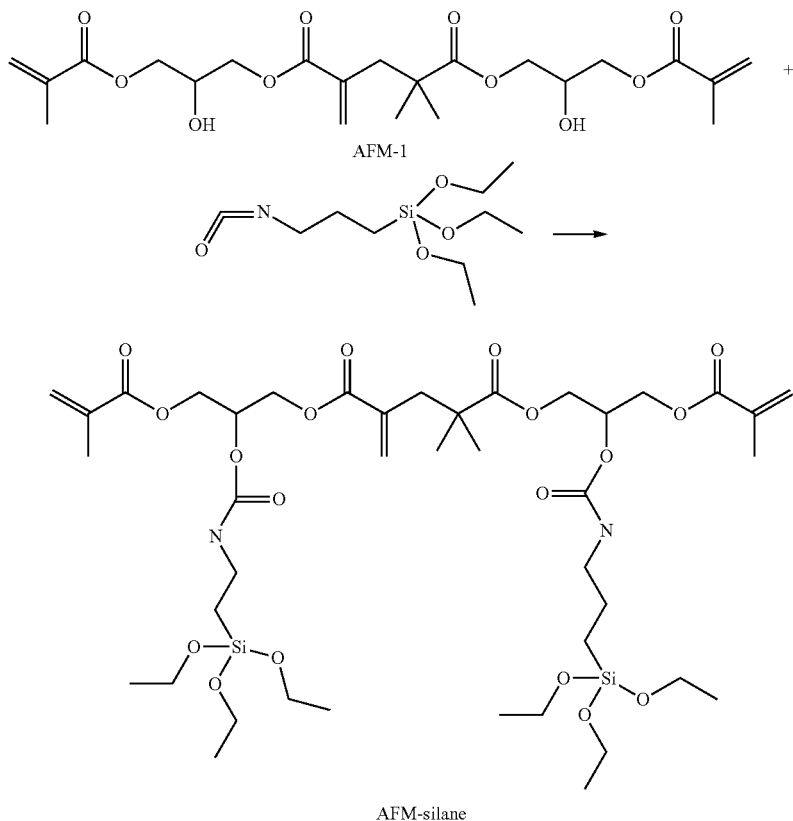

AFM-silane

An AFM-silane was prepared by mixing AFM-1 (3.00 g), 3-isocyanatopropyltriethoxysilane (3.24 g), and 1 drop of dibutyltin dilaurate in a container. The mixture was allowed to react overnight at room temperature (approximately 23° C.). The AFM-Silane was confirmed by analysis through Fourier Transform Infrared spectroscopy (FTIR) showing the loss of isocyanate peak from the silane.

Example 9

Filler 1

A filler was prepared by mixing 50.03 g of Particle B, 4.51 g of GF-31 silane 0.77 g of AFM-Silane, 58 g of ethyl acetate, and catalyzing the reaction with 1.004 g of 30% ammonium hydroxide solution. The mixture was stirred overnight on a stir plate at room temperature. The solvent was flashed off in a fume hood the next morning, and heated for 30 min at 85° C. to complete the reaction. The particles contained 1.5% AFM-silane.

Example 10

Filler 2

A filler was prepared as in Example 9 except that 50.00 g of Particle B, 1.27 g of AFM-silane, 4.01 g of GF-31 Silane, 1.055 g of 30% ammonium hydroxide solution, and 50.7 g of ethyl acetate were used. The particles contained 2.5% AFM-silane.

Example 11

Filler 3

A filler was prepared as in Example 9 except 50.07 g of Particle B, 2.51 g of AFM-Silane, 2.753 g of GF-31, 1.041 g of 30% ammonium hydroxide solution, and 50.6 g ethyl acetate were used. The particles contained 5% AFM-Silane.

Example 12

Filler 4

A filler was prepared as in Example 9 except that 29.98 g of Particle A 0.965 g of AFM-silane, 1.61 g of GF-31 silane, 41.7 g ethyl acetate and 0.64 g 30% ammonium hydroxide solution were used.

Examples 13-14, Control Example C2

Paste Compositions

A dental resin composition was prepared by stirring the components shown in Table 3 at approximately 45° C. until all components were dissolved.

TABLE 3

Dental Resin Composition

| Component | Amount in weight % |
| --- | --- |
| BisGMA | 13.94 |
| 90/10 Resin (BisGMA/TEGDMA) | 11.82 |
| UDMA Resin | 34.40 |
| BisEMA6 Resin | 34.40 |
| PEG 600 DMA | 3.74 |
| CPQ | 0.22 |
| DPIHFP | 0.35 |
| IRGACURE 819 | 0.05 |
| ENMP | 0.81 |
| BHT | 0.15 |
| Benzotriazole | 0.12 |

Example C2 (Paste1) was a paste prepared by mixing 4.40 g of the dental resin with 0.82 g of Nanozirconia filler 1.5216 g of Nanosilica filler, and 13.26 g of Particle B to form a uniform mixture.

Example 13 (Paste 2) was a paste prepared by mixing 13.26 g of the filler from Example 10 (Filler 2), 0.83 g of Nanozirconia filler, 1.54 g of Nanosilica filler and 4.4021 g of dental resin to form a uniform mixture.

Example 14 (Paste 3) was a paste prepared by mixing 4.40 g of dental resin, 0.83 g of Nanozirconia filler, 1.52 g of Nanosilica filler and 13.26 g of the filler of Example 11 (Filler 3) to form a uniform mixture.

The pastes for each example were tested according to the above described test methods for the rate of shrinkage in the Watts Shrinkage Test Method, and for mechanical properties in the Diametral Tensile Strength Test Method.

The rate of shrinkage (determined from the slope of the raw shrinkage data) is shown in FIG. 1. As can be seen from the data, a significant reduction in the shrinkage rate (which has been found to correspond to stress measurements), was seen with increasing levels of the AFM-Silane material. Paste 1 contained only GF-31 (3-methacryloxypropyltrimethoxy-silane), whereas Pastes 2 and 3 had increasing amounts of the AFM-Silane on the cluster filler that was incorporated into the formulation.

The diametral tensile strength test results in Table 4 show that the AFM-Silane treated particles provide acceptable mechanical properties for dental composites.

TABLE 4

Diametral Tensile Strength

| Example | Diametral Tensile Strength (MPa) |
| --- | --- |
| 13 | 80.7 |
| 14 | 76.3 |
| C2 | 70.9 |

Example 15

Preparation of AFM-Caprolactone

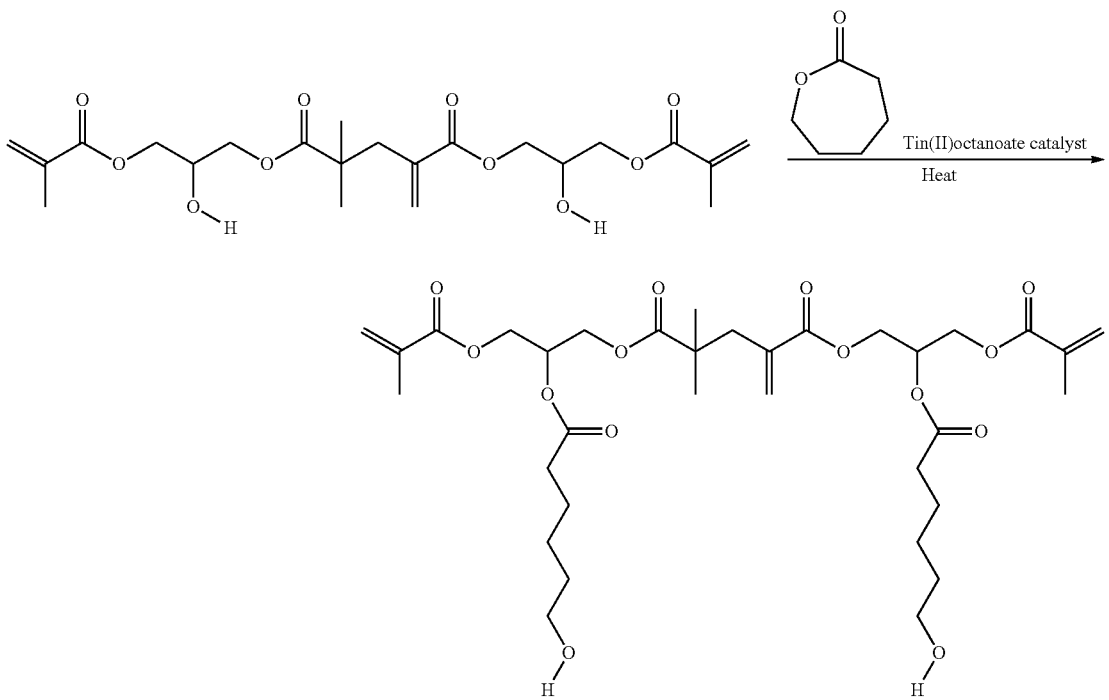

AFM-1 (32 g, 0.07 mol), caprolactone (16 g, 0.14 mol), tin(II)octanoate (0.05 g) and BHT (0.08 g) were charged into a 100 mL round bottom flask equipped with a mechanical stirrer and dry air flowing through the flask to a bubbler and a condenser. With continuous stirring, the mixture was heated at 130-140 C overnight to provide a viscous yellow liquid in 95% yield. NMR confirmed the structure.

Example 16

Preparation of AFM-Caprolactonyl Phosphate

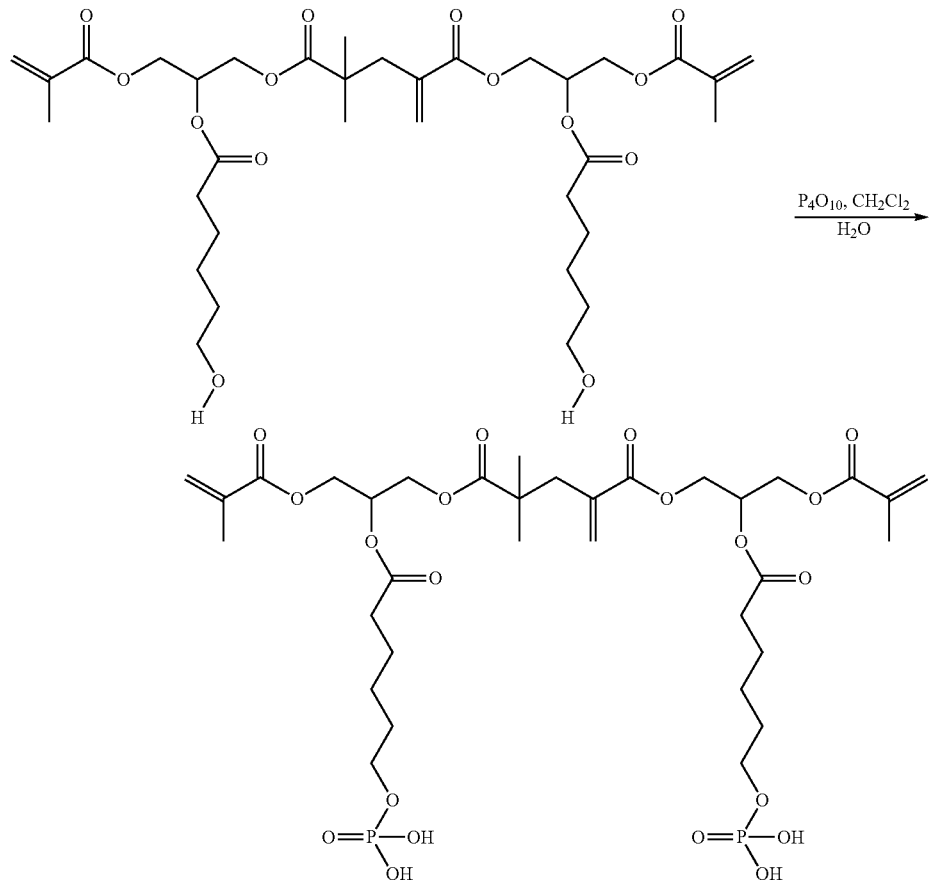

Phosphorous pentoxide ($P_4O_{10}$, 5.10 g, 0.0180 mol) was suspended in 10 mL of $CH_2Cl_2$ in a 500 mL 3-neck round bottom flask. The flask was pre-dried with a heat gun as nitrogen was purged through, then cooled to room temperature under nitrogen. The flask was also equipped with a mechanical stirrer, a temperature controller and nitrogen streaming through the flask into a nearby bubbler and a dropping funnel. A solution of AFM-caprolactone (24.5 g, 0.0358 mol) in 50 mL $CH_2Cl_2$ was added slowly to the suspension in about 30 minutes. The dropping funnel was replaced with a condenser. The mixture was refluxed for 45 minutes. The heat was turned off and, after cooling to room temperature, water (0.68 g, 0.038 mol) was added followed by resumption of refluxing for another 45 minutes. After cooling to room temperature, the mixture was filtered, then concentrated to yellow oil with 90% yield. $^{31}P$ NMR confirmed the presence of P nuclei Example 17

Preparation of AFM-Trimellitic Acid Adduct

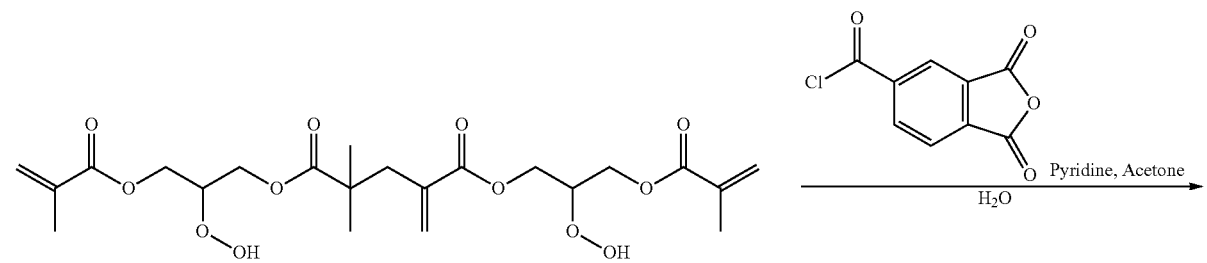

-continued

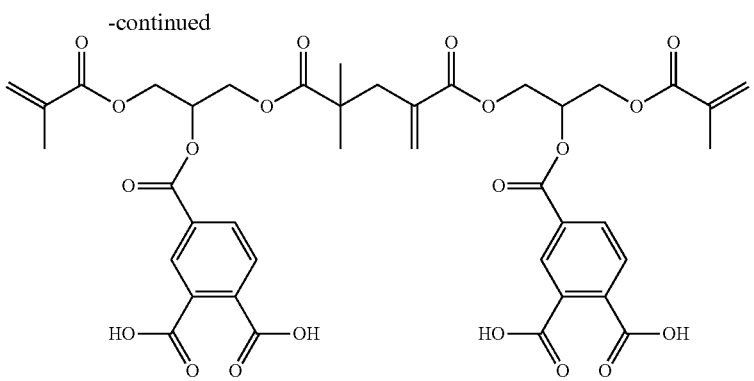

Trimellitic acid anhydride chloride (32.40 g, 0.154 mol) was dissolved 100 mL acetone in a 3-neck flask under nitrogen. The flask was cooled in an ice bath. The solution was stirred continuously while a solution of AFM-1 (35.25 g, 0.0773 mol), and pyridine (12.32 g, 0.154 mol) in 50 ml of acetone was added slowly to the cold solution using a dropping funnel. After addition was completed, the flask contents were continuously stirred at room temperature for 4 hours. Water (2.77 g, 0.154 mol) was added and stirring at room temperature was continued overnight. Then the solid formed was removed by vacuum filtration and washed with acetone. The filtrate was concentrated and dried to a white solid with 73% yield. The structure confirmed by NMR.

Example 18

Preparation of AFM-Caprolaconyl Trimellitic Acid

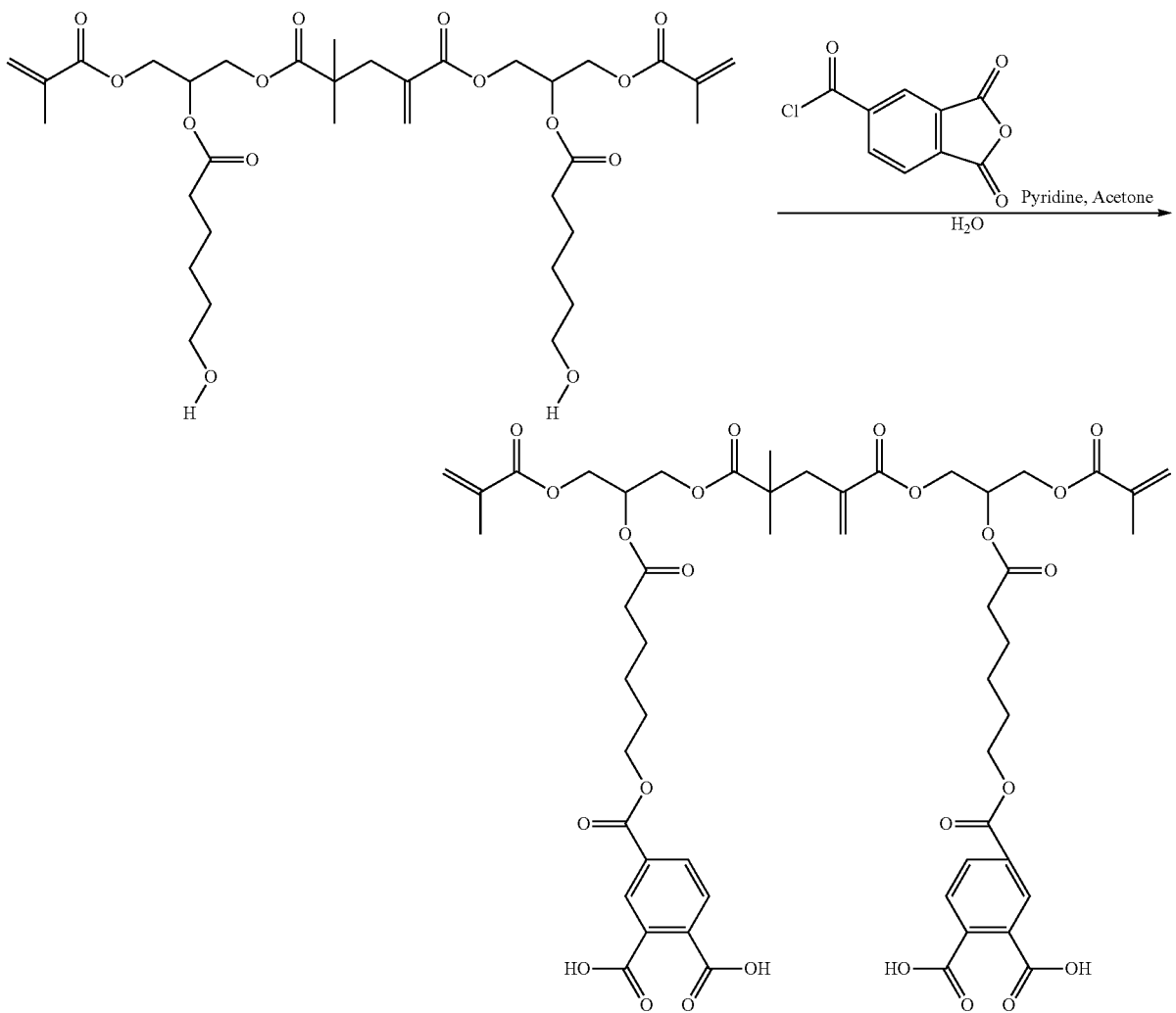

Trimellitic acid anhydride chloride (50 g, 0.240 mol) is dissolved in 150 mL acetone in a 3-neck flask under nitrogen. The flask is cooled in an ice bath. A solution of AFM-caprolactone intermediate (82.05 g, 0.12 mol), and pyridine (19.0 g, 0.240 mol) in 80 ml of acetone is added slowly through a dropping funnel while continuously stirring the cold solution. After addition is completed, the flask contents are continuously stirred at room temperature for 4 hours. Water (4.32 g, 0.240 mol) is added and the solution is stirred continuously at room temperature overnight. The solids formed are removed by vacuum filtration and washed with acetone. The filtrate is concentrated and dried to yield the product Examples 19-24, Control Examples C3-C4

Resin Compositions

Resin compositions were prepared by mixing the AFMs from Examples 2, 3, 4, 16, and 17 with the components shown in Tables 5 and 6 to form uniform mixtures. The components are in amounts by weight percent. Examples 19-22 were prepared and tested with Control Example C3, and Examples 23-24 were prepared and tested with Control Example C4.

The resin compositions were tested for the amount of deflection (Stress) in micrometers (μm) and the depth of cure (DOC) in millimeters (mm) according to the test procedures described above. The test results in Tables 5 and 6 shows that increasing the amount of AFM in the resin composition reduced the amount of deflection of the cusp in the Stress Test during curing of the resin. The Depth of Cure values were acceptable for use as a dental composite.

Examples 25-28, Control Example C5

Nanoparticle Fillers with AFM-Silane

Compositions were prepared having the components shown in Table 7 according to the following procedure. A silica sol (Nalco 2327k) was added to an 8 ounce (235 ml) glass bottle with Teflon-wrapped threads and stirred with a magnetic stir bar. Solutions were prepared by mixing methoxypropanol, Prostab, silane (3-methacryloxy propyl trimethoxysilane), and AFM-silane, prepared as described in Example 8, to a 115 mL amber glass bottle and then added to the silica sol and stirred over approximately 5 minutes.

The glass jar was then sealed with a Teflon-lined metal cap, Teflon tape, and electrical tape. The reaction was heated to 90° C. with stirring. After approximately 18 hours, the reaction mixture was transferred to a 250 mL round-bottomed flask and concentrated to approximately 45 wt % solids in vacuo (approximately half the original volume). Approximately 55 grams of methoxypropanol was added to lower the solids back to approximately 20 wt %. The solution was then concentrated again to approximately 45 wt % functionalized nanoparticle solids (about 50 mL) in vacuo.

Control Example C5 was prepared according to the same procedure except that 100 grams of silica sol (Nalco 2329k sol; 41.33 wt. %) was added to a 16 ounce (470 mL) glass jar with Teflon-wrapped threads. A solution of methoxypropanol (112.5 g), Prostab (0.0250 g of a 0.05 wt. % solution in water) and silane (3.182 g) was added to the silica sol and stirred. No AFM-silane was added.

TABLE 5

| | Resin Compositions - weight % | | | | | | | | |
|---|---|---|---|---|---|---|---|---|---|
| Component | C3 | Example 19 | | Example 20 | | Example 21 | | Example 22 | |
| AFM | None | Ex 3 | | Ex 2 | | Ex 16 | | Ex 17 | |
| AFM | 0.00 | 2.00 | 4.00 | 2.00 | 4.00 | 2.00 | 4.00 | 2.00 | 4.00 |
| BisGMA | 17.2 | 16.34 | 15.48 | 16.34 | 15.48 | 16.34 | 15.48 | 16.34 | 15.48 |
| HEMA | 8.0 | 7.60 | 7.20 | 7.60 | 7.20 | 7.60 | 7.20 | 7.60 | 7.20 |
| UDMA | 4.0 | 3.80 | 3.60 | 3.80 | 3.60 | 3.80 | 3.60 | 3.80 | 3.60 |
| MHP | 10.0 | 9.50 | 9.00 | 9.50 | 9.00 | 9.50 | 9.00 | 9.50 | 9.00 |
| CPQ | 0.16 | 0.152 | 0.144 | 0.152 | 0.144 | 0.152 | 0.144 | 0.152 | 0.144 |
| EDMAB | 0.44 | 0.418 | 0.396 | 0.418 | 0.396 | 0.418 | 0.396 | 0.418 | 0.396 |
| DPIHFP | 0.20 | 0.19 | 0.18 | 0.19 | 0.18 | 0.19 | 0.18 | 0.19 | 0.18 |
| Z250 | 60.00 | 60.00 | 60.00 | 60.00 | 60.00 | 60.00 | 60.00 | 60.00 | 60.00 |
| | | | | Test results | | | | | |
| Deflection - μm | 5.94 | 3.95 | 2.33 | 4.36 | 2.72 | 4.18 | 3.34 | 4.35 | 3.18 |
| DOC - mm | 3.89 | 3.56 | 3.28 | 3.66 | 3.40 | 3.74 | 3.47 | 3.81 | 3.61 |

TABLE 6

| | Resin Compositions - weight % | | | | |
|---|---|---|---|---|---|
| Component | C4 | Example 23 | | Example 24 | |
| AFM | None | Ex 3 | | Ex 4 | |
| AFM | 0.00 | 2.00 | 4.00 | 2.00 | 4.00 |
| BisGMA | 17.40 | 16.53 | 15.66 | 16.53 | 15.66 |
| HEMA | 11.60 | 11.02 | 10.44 | 11.02 | 10.44 |
| MHP | 10.00 | 9.50 | 9.00 | 9.50 | 9.00 |
| CPQ | 0.32 | 0.30 | 0.29 | 0.30 | 0.29 |
| EDMAB | 0.48 | 0.46 | 0.43 | 0.46 | 0.43 |
| DPIHFP | 0.20 | 0.19 | 0.18 | 0.19 | 0.18 |
| Z250 | 60.00 | 60.00 | 60.00 | 60.00 | 60.00 |
| | | Test Results | | | |
| Deflection - μm | 3.62 | 2.57 | 1.74 | 2.86 | 1.91 |
| DOC - mm | 3.58 | 3.13 | 2.89 | 2.90 | 2.63 |

The wt % solids of each example was determined by adding approximately 0.250 g of the final solution to an aluminum pan and drying in an oven set at 125° C. for 45 minutes. The sample was then removed from the oven, allowed to cool to room temperature, and the mass of the dried sample was measured and used to calculate percent solids in the nanoparticle solution. The functionalized nanoparticle compositions are suitable as fillers in resin compositions.

TABLE 7

| | Nanoparticle compositions - grams | | | | |
|---|---|---|---|---|---|
| Component | Ex 25 | Ex 26 | Ex 27 | Ex 28 | Ex C5 |
| Silica sol - g | 50 | 50 | 50 | 50 | 100 |
| Methoxy propanol - g | 56.25 | 56.25 | 56.25 | 56.25 | 112.5 |
| Silane - g | 2.864 | 2.546 | 1.909 | 1.273 | 3.182 |

TABLE 7-continued

| Component | Nanoparticle compositions - grams | | | | |
|---|---|---|---|---|---|
| | Ex 25 | Ex 26 | Ex 27 | Ex 28 | Ex C5 |
| AFM-Silane - g | 0.609 | 1.219 | 2.437 | 3.656 | None |
| Prostab - 0.05 wt % solution in water - g | 0.0125 | 0.0125 | 0.0125 | 0.0125 | 0.250 |
| Final wt % solids | 38.0 | 40.6 | 37.8 | 41.7 | 45.0 |

Examples 29-32, Control Example C6

Hard Coats

Hard coat solutions were prepared by combining the methoxy propanol solution of functionalized silica nanoparticles from Examples 25-28 and C5, pentaerythritol triacrylate, Irgacure™ 651 in the amounts shown in Table 8 in a 20 mL glass vial. Methoxy propanol was added to bring the weight percent solids of the solution to 50 percent. The solutions were mixed well and sonicated for 2-5 minutes.

TABLE 8

| Component | Hard coat Compositions - grams | | | | |
|---|---|---|---|---|---|
| | Ex 29 | Ex 30 | Ex 31 | Ex 32 | Ex C6 |
| Nanoparticle composition of Ex 25 | 6.586 | | | | |
| Nanoparticle composition of Ex 26 | | 6.153 | | | |
| Nanoparticle composition of Ex 27 | | | 6.619 | | |
| Nanoparticle composition of Ex 28 | | | | 5.997 | |
| Nanoparticle composition of Ex C5 | | | | | 5.559 |
| Pentaerythritol Triacryalte | 2.45 | 2.45 | 2.45 | 2.45 | 2.45 |
| IrgacureTM 651 | 0.05 | 0.05 | 0.05 | 0.05 | 0.05 |
| Additional Methoxy Propanol | 0.914 | 1.347 | 0.881 | 1.503 | 1.941 |

The solutions were coated onto 6×14 inch sheets of 5 mil thick PET film (prepared as described in Example 29 of U.S. Pat. No. 6,893,731 (Kausch)), using a #10 wire-wound rod (obtained from RD Specialties, Webster, N.Y.). The coated samples were dried in an oven set at 75° C. for 30 minutes. The coated films were then cured by irradiating with UV light (1000 mJ/cm$^2$, UVB) using a UV processor (Fusion UV System, Inc., Gaithersburg, Md.) equipped with an H-bulb and operated under nitrogen atmosphere at a line speed of 24 feet/min (2 passes) to provide hard coats on the PET film.

After irradiation, the coated films were measured for film curl, hard coat thickness, and pencil hardness. Results are shown in Table 9. The film curl was measured on a 7.6×7.6 cm square sample that was cut from the center of a coated film. The sample was placed on a flat surface, and the height of each corner was measured using a ruler. The total curl was determined by summing the height of the four corners.

The film thickness was measured at each corner of the 7.6×7.6 cm square and in the middle of each side (eight measurements total) using a dial gage (Mitutoyo Digital Dial Gauge, Model ID-F125E, Mitutoyo Corp.; Aurora, Ill.). The average film thickness was calculated using these eight measurements.

The pencil hardness was measured on each hard coat using an Elcometer 3086 motorized pencil hardness tester (obtained from Elcometer Inc. of Rochester Hills, Mich.) with a 7.5 N load following ASTM D3363.

TABLE 9

| | Hard coat Properties Example | | | | |
|---|---|---|---|---|---|
| | Ex C6 | Ex 29 | Ex 30 | Ex 31 | Ex 32 |
| | Film Curl Measurements | | | | |
| Corner height measurements (mm) | 16.0 | 16.0 | 13.5 | 10.0 | 12.5 |
| | 17.0 | 2.0 | 3.0 | 11.0 | 12.0 |
| | 2.5 | 0.5 | 1.0 | 3.0 | 1.0 |
| | 3.0 | 14.0 | 18.0 | 3.0 | 1.0 |
| Total corner height (mm) | 38.5 | 32.5 | 35.5 | 27.0 | 26.5 |
| Relative to Control (%) | 100 | 84.4 | 92.2 | 70.1 | 68.8 |
| | Hard coat Thickness | | | | |
| Corner & side measurements (μm) | 5 | 7 | 7 | 7 | 6 |
| | 5 | 6 | 7 | 6 | 6 |
| | 6 | 7 | 7 | 7 | 7 |
| | 7 | 6 | 7 | 7 | 7 |
| | 6 | 7 | 7 | 6 | 7 |
| | 7 | 5 | 6 | 7 | 7 |
| | 7 | 6 | 7 | 5 | 6 |
| | 7 | 6 | 7 | 5 | 7 |
| Avg Hard coat Thickness (μm) | 6.3 | 6.0 | 6.8 | 5.8 | 6.8 |
| Standard Deviation | 0.9 | 0.8 | 0.5 | 1.0 | 0.5 |
| Relative to Control (%) | 100.0 | 96.0 | 108.0 | 92.0 | 108.0 |
| | Hardness | | | | |
| Pencil hardness | 3H | 3H | 3H | 4H | 4H |

Examples 33-36, Control Example C7

AFM Modified Structural Adhesives

A 2-part structural adhesive (DP807) was modified with AFM-glutarate from Example 1 in the amounts shown in Table 9. The DP807 adhesive was supplied in a duo-pak cartridge. Each part was removed from the cartridge and separately mixed with the same amount of AFM-glutarate as shown in Table 10, e. g, 0.38%. After mixing, each part was charged back into its respective container in the cartridge. The adhesive was mixed and dispensed from the cartridge in a 1:1 ratio so the total percentage of AFM remained the same, e.g., 0.38%.

The structural adhesives were tested for Overlap Shear Strength, Handling Properties (wet-out and work life), and Curing Stress according to test procedures described above. Test results are shown in Table 10. The results for overlap shear strength show an acceptable strength for all of the adhesives with increased wet out and work life times for the examples containing AFM-glutarate. The addition of AFM-glutarate to the adhesive formulation also showed a significant decrease in stress during curing as indicated by a sizeable drop in the measured aluminum shim height at 2.125" width with a corresponding decrease in the shim curl.

TABLE 10

| | Structure Adhesive Compositions - weight % Example | | | | |
|---|---|---|---|---|---|
| | Ex C7 | Ex 33 | Ex 34 | Ex 35 | Ex 36 |
| DP807 | 100 | 99.62 | 99.25 | 98.50 | 96.25 |
| AFM-glutarate | 0 | 0.38 | 0.75 | 1.50 | 3.75 |
| Wt. % relative to AFM-1 adjusted for mw | 0 | 0.25 | 0.5 | 1 | 2.5 |
| | Overlap Shear Strength* - MPa | | | | |
| Sample 1 | 25.9 | 31.0 | 27.8 | 28.6 | 25.7 |
| Sample 2 | 34.8 | 31.9 | 27.1 | 27.3 | 28.4 |

TABLE 10-continued

| | Structure Adhesive Compositions - weight % Example | | | | |
|---|---|---|---|---|---|
| | Ex C7 | Ex 33 | Ex 34 | Ex 35 | Ex 36 |
| Sample 3 | 30.9 | 30.0 | 30.0 | 27.3 | 26.6 |
| Mean | 30.5 | 31.0 | 28.3 | 27.7 | 26.9 |
| SD | 4.5 | 1.0 | 1.5 | 0.7 | 1.4 |
| | Handling Properties - minutes | | | | |
| Wet Out (min) | 5 | 10 | 10 | 15 | 20 |
| Work Life (min) | 7 | 9.5 | 11.5 | 12.5 | 15 |
| | Curing Stress Test Shim Height at 2.125 inches width | | | | |
| N | 4 | 4 | 4 | 4 | 4 |
| Mean - um | 1677 | 1675 | 1213 | 1296 | 957 |
| Std Dev (SD) | 106 | 159 | 409 | 221 | 222 |
| SD as % of avg | 6.3 | 9.5 | 33.7 | 17.0 | 23.2 |
| % of control stress | 100 | 99.8 | 72.3 | 77.3 | 57.1 |
| Stress Reduction (%) | 0 | 0.2 | 27.7 | 22.7 | 42.9 |

*All samples failed cohesively. All values were acceptable (>3000 psi (20.7 megaPascals).

This disclosure provides the following illustrative embodiments

1. An addition-fragmentation agent comprising: 1) a labile addition-fragmentation group, 2) a free-radically polymerizable group, and 3) a surface-modifying functional group that associates with the surface of a substrate.

2. The addition-fragmentation agent of embodiment 1 wherein the addition-fragmentation group 1) is of the formula:

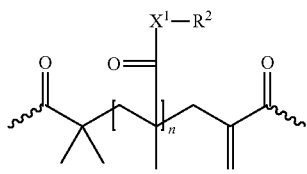

wherein $R^2$ is $Z_m$-Q-, $Y_p$-Q'-, a (hetero)alkyl group or a (hetero)aryl group;

$X^1$ is independently —O— or —$NR^4$—, where $R^4$ is H or $C_1$-$C_4$ alkyl,

Q is a covalent bond or a linking group, preferably a (hetero)hydrocarbyl linking group, having a valence of m+1;

Q' is a covalent bond or a linking group, preferably a (hetero)hydrocarbyl linking group, having a valence of p+1;

Z is an ethylenically unsaturated polymerizable group,

Y is an functional group that associates with a substrate on which the addition-fragmentation agent is disposed;

m is 1 to 6;

p is 1 or 2;

n is 0 or 1.

3. The addition fragmentation agent of any of embodiments 1-2 of the formula:

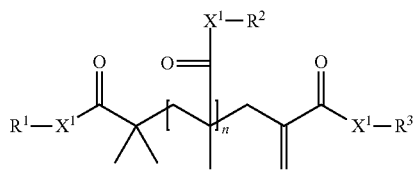

wherein $R^1$, $R^2$ and $R^3$ are each independently $Z_m$-Q-, $Y_p$-Q'-, a (hetero)alkyl group or a (hetero)aryl group with the proviso that at least one of $R^1$, $R^2$ and $R^3$ is $Z_m$-Q-, and with the proviso that at least one of $R^1$, $R^2$ and $R^3$ is $Y_p$-Q'-

Q is a covalent bond or a linking group, preferably a (hetero)hydrocarbyl linking group, having a valence of m+1;

Q' is a covalent bond or a linking group, preferably a (hetero)hydrocarbyl linking group, having a valence of p+1;

Z is an ethylenically unsaturated polymerizable group,

Y is a functional group that associates with a substrate on which the addition-fragmentation agent is disposed;

m is 1 to 6;

p is 1 or 2;

each $X^1$ is independently —O— or —$NR^4$—, where $R^4$ is H or $C_1$-$C_4$ alkyl, and n is 0 or 1.

4. The addition-fragmentation agent of any of embodiments 2 or 3 wherein at least one of $R^1$, $R^2$ and $R^3$ contain both $Z_m$-Q- and $Y_p$-Q'-, where Q is a covalent bond or a linking group, preferably a (hetero)hydrocarbyl linking group, having a valence of m+1;

Q' is a covalent bond or a linking group, preferably a (hetero)hydrocarbyl linking group, having a valence of p+1;

Z is an ethylenically unsaturated polymerizable group, m is 1 to 6;

p is 1 or 2; and

Y is an functional group that associates with a substrate on which the addition-fragmentation agent is disposed.

5. The addition-fragmentation agent of any of embodiments 2 to 4 where Z comprises a vinyl, vinyloxy, (meth)acryloxy, (meth)acrylamido, styrenic and acetylenic functional groups.

6. The crosslinking agent of any of embodiments 2 to 5 where Z is selected from:

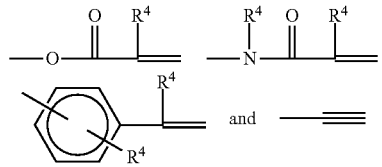

wherein $R^4$ is H or $C_1$-$C_4$ alkyl

7. The addition-fragmentation agent of any of embodiments 2 to 6 wherein Q is selected from from —O—. —S—, —$NR^4$—, —$SO_2$—, —$PO_2$—, —CO—, —OCO—, —$R^6$—, —$NR^4$—CO—$NR^4$—, $NR^4$—CO—O—, $NR^4$—CO—$NR^4$—CO—O—$R^6$—, —CO—$NR^4$—$R^6$—, —$R^6$—CO—O—$R^6$—, —O—$R^6$—. —S—$R^6$—, —$NR^4$—$R^6$—, —$SO_2$—$R^6$—, —$PO_2$—$R^6$—, —CO—

R$^6$—, —OCO—R$^6$—, —NR$^4$—CO—R$^6$—, NR$^4$—R$^6$—CO—O—, and NR$^4$—CO—NR$^4$—, wherein each R$^4$ is hydrogen, a C$_1$ to C$_4$ alkyl group, or aryl group, each R$^6$ is an alkylene group having 1 to 6 carbon atoms, a 5- or 6-membered cycloalkylene group having 5 to 10 carbon atoms, or a divalent arylene group having 6 to 16 carbon atoms, with the proviso that Q-Z does not contain peroxidic linkages.

8. The addition-fragmentation agent of any of embodiments 2 to 7 where Q is an alkylene.

9. The addition-fragmentation agent of embodiment 8 wherein Q is an alkylene of the formula —C$_r$H$_{2r}$—, where r is 1 to 10.

10. The addition-fragmentation agent of any of embodiments 2 to 7 where Q is a hydroxyl-substituted alkylene.

11. The addition-fragmentation agent of any of embodiments 2 to 7 where Q is —CH$_2$—CH(OH)—CH$_2$—

12. The addition-fragmentation agent of any of embodiments 2 to 7 where Q is an aryloxy-substituted alkylene.

13. The addition-fragmentation agent of any of embodiments 2 to 7 where Q is an alkoxy-substituted alkylene.

14. The addition-fragmentation agent of any of embodiments 2 to 13 wherein R$^1$—X$^1$— groups, and optionally R$^2$—X$^1$— and R$^3$—X$^1$— groups, are selected from H$_2$C=C(CH$_3$)C(O)—O—CH$_2$—CH(OH)—CH$_2$—O—, H$_2$C=C(CH$_3$)C(O)—O—CH$_2$—CH(O—(O)C(CH$_3$)=CH$_2$)—CH$_2$—O—, H$_2$C=C(CH$_3$)C(O)—O—CH(CH$_2$OAr)—CH$_2$—O—, H$_2$C=C(CH$_3$)C(O)—O—CH$_2$CH$_2$—N(H)—C(O)—O—CH(CH$_2$OAr)—CH$_2$—O—, H$_2$C=C(CH$_3$)C(O)—O—CH$_2$—CH(O—(O)C—N(H)—CH$_2$CH$_2$—O—(O)C(CH$_3$)C=CH$_2$)—CH$_2$—O—, H$_2$C=C(H)C(O)—O—(CH$_2$)$_4$—O—CH$_2$—CH(OH)—CH$_2$—O—, H$_2$C=C(CH$_3$)C(O)—O—CH$_2$—CH(O—(O)C—N(H)—CH$_2$CH$_2$—O—(O)C(CH$_3$)C=CH$_2$)—CH$_2$—O—, CH$_3$—(CH$_2$)$_7$—CH(O—(O)C—N(H)—CH$_2$CH$_2$—O—(O)C(CH$_3$)C=CH$_2$)—CH$_2$—O—, H$_2$C=C(H)C(O)—O—(CH$_2$)$_4$—O—CH$_2$—CH(—O—(O)C(H)=CH$_2$)—CH$_2$—O— and H$_2$C=C(H)C(O)—O—CH$_2$—CH(OH)—CH$_2$—O—. H$_2$C=C(H)C(O)—O—(CH$_2$)$_4$—O—CH$_2$—CH(—O—(O)C(H)=CH$_2$)—CH$_2$—O—, and CH$_3$—(CH$_2$)$_7$—CH(O—(O)C—N(H)—CH$_2$CH$_2$—O—(O)C(CH$_3$)C=CH$_2$)—CH$_2$—O—, where Ar is an aryl group.

15. The addition-fragmentation agent of any of embodiments 2 to 14 wherein Y is a monophosphate, a phosphonate, a phosphonic acid, a hydroxamic acid, a carboxylic acid, and acetoacetate, an anhydride, an isonitrile group, a silyl, a disulfide, a thiol, an amino, a sulfuric acid, a sulfonic acid, a phosphine, a phenolic or a heterocyclic aromatic group.

16. The adhesive composition of embodiment 15 wherein Y is a silyl group of the formula: —SiR$^7$$_3$, wherein each R$^7$ group is independently selected from the group of alkoxy, acetoxy, and halide.

17. The dental composition of any of embodiments 2 to 16 wherein R$^1$—X$^1$— groups, and optionally R$^2$—X$^2$— groups, are selected from H$_2$=C(CH$_3$)C(O)—O—CH$_2$—CH(O—PO$_3$H$_2$)—CH$_2$—O—, H$_2$=C(CH$_3$)C(O)—O—CH$_2$—CH(O—C(O)—(CH$_2$)$_3$C(O)OH)—CH$_2$—O—, H$_2$C=C(CH$_3$)C(O)—O—CH$_2$—CH(O—C(O)—(CH$_2$)$_2$C(O)OH)—CH$_2$—O—, and H$_2$C=C(CH$_3$)C(O)—O—CH$_2$—CH(O—C(O)—NH—(CH$_2$)$_3$Si(OEt)$_3$)—CH$_2$—O—.

18. A polymerizable composition comprising the addition-fragmentation agent of any of embodiments 1-17, at least one free-radically polymerizable monomer, and an initiator.

19. The polymerizable composition of embodiment 18 comprising:
a) 85 to 100 parts by weight of an (meth)acrylic acid ester;
b) 0 to 15 parts by weight of an acid functional ethylenically unsaturated monomer;
c) 0 to 10 parts by weight of a non-acid functional, ethylenically unsaturated polar monomer;
d) 0 to 5 parts vinyl monomer; and
e) 0 to 5 parts of a multifunctional (meth)acrylate; based on 100 parts by weight total monomer a) to e), and
f) 0.1 to 10 parts by weight of the addition-fragmentation agent, based on 100 parts by weight of a) to e).

20. The polymerizable composition of embodiment 19 further comprising 0.01 to 5 parts of a multifunctional (meth)acrylate.

21. The polymerizable composition of any of embodiments 18 to 20 further comprising a photoinitiator.

22. The polymerizable composition of any of embodiments 18 to 20 wherein the initiator is a thermal initiator.

23. A method of making the addition-fragmentation agent comprising the step of reacting a compound of the formula:

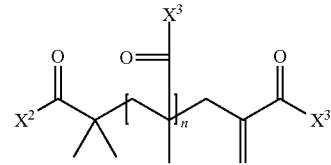

wherein X$^2$ comprises an electrophilic or nucleophilic functional group,
X$^3$ is X$^2$, X$^1$—R$^2$ or X$^1$—R$^3$, and
n is 0 or 1;
with compounds of the formulas:

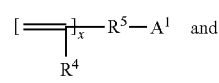   IIIa

   IIIb wherein
A$^1$ and A$^2$ are each a functional group that is co-reactive with functional group X$^2$, R$^4$ is hydrogen, a C$_1$ to C$_4$ alkyl group, R$^5$ and R$^{5*}$ are each a single bond or a di- or trivalent (hetero)hydrocarbyl linking group that joins the ethylenically unsaturated group to reactive functional groups A$^1$ and A$^2$, and x is 1 or 2.

24. The method of embodiment 23 wherein R$^5$ is selected from a single bond or a divalent linking group that joins an ethylenically unsaturated group to co-reactive functional group A.

25. The method of any of embodiments 23 or 24 wherein R$^5$ is selected from —O—. —S—, —NR$^4$—, —SO$_2$—, —PO$_2$—, —CO—, —OCO—, —NR$^4$—CO—, NR$^4$—CO—O—, NR$^4$—CO—NR$^4$—, —R$^6$— and combinations thereof, where R$^6$ is an alkylene group having 1 to 6 carbon atoms, a 5- or 6-membered cycloalkylene group having 5 to 10 carbon atoms, or a divalent arylene group having 6 to 16 carbon atoms.

26. The method of embodiment 18 wherein the co-reactive functional groups A$^1$ and A$^2$ are each selected from hydroxyl, amino, oxazolinyl, oxazolonyl, acetyl, acetonyl, carboxyl, isocyanato, epoxy, aziridinyl, acyl halide, vinyloxy, and cyclic anhydride groups.

27. The method of any of embodiments 18 to 26,
where the reactive functional group $X^2$ is isocyanato functional group, the co-reactive functional group $A^1$ and $A^2$ each comprises a primary or secondary amino or hydroxyl group;
where the reactive functional group $X^2$ comprises a hydroxyl group, the co-reactive functional group $A^1$ and $A^2$ each comprises a carboxyl, ester, acyl halide, isocyanato, epoxy, anhydride, azlactonyl or oxazolinyl group;
where the reactive functional group $X^2$ comprises a carboxyl group, the co-reactive functional group $A^1$ and $A^2$ each comprises a hydroxyl, amino, epoxy, isocyanate, or oxazolinyl group.

28. A surface-modified inorganic oxide of the formula:

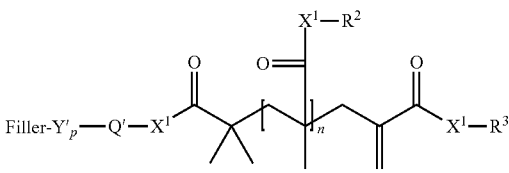

where
Filler is an inorganic oxide particle,
$R^2$ and $R^3$ are each independently $Z_m$-Q-, $Y_p$-Q'-, a (hetero)alkyl group or a (hetero)aryl group;
Q is a covalent bond or a linking group, preferably an organic (hetero)hydrocarbyl linking group having a valence of m+1;
Q' is a covalent bond or an or a linking group, preferably an organic (hetero)hydrocarbyl linking group having a valence of p+1;
Z is an ethylenically unsaturated polymerizable group,
Y' is the residue of the surface-modifying organic functional group that associates with a substrate on which the addition-fragmentation agent is disposed;
m is 1 to 6;
p is 1 or 2;
$X^1$ is independently —O— or —NR$^4$—, where R$^4$ is H or $C_1$-$C_4$ alkyl, and
n is 0 or 1.

29. A polymerizable composition comprising at least one free-radically polymerizable monomer, an initiator and the surface-modified inorganic oxide of embodiment 28.

30. The polymerizable composition of embodiment 18, further comprising a surface-modified inorganic oxide of the formula:

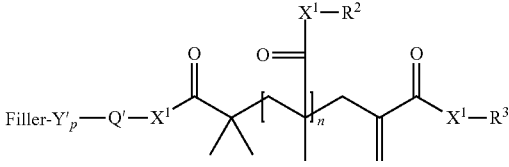

where
Filler is an inorganic oxide particle,
$R^2$ and $R^3$ are each independently $Z_m$-Q-, $Y_p$-Q'-, a (hetero)alkyl group or a (hetero)aryl group;
Q is a covalent bond or a linking group, preferably an organic (hetero)hydrocarbyl linking group having a valence of m+1;

Q' is a covalent bond or an or a linking group, preferably an organic (hetero)hydrocarbyl linking group having a valence of p+1;
Z is an ethylenically unsaturated polymerizable group,
Y' is the residue of the surface-modifying organic functional group that associates with a substrate on which the addition-fragmentation agent is disposed;
m is 1 to 6;
p is 1 or 2;
$X^1$ is independently —O— or —NR$^4$—, where R$^4$ is H or $C_1$-$C_4$ alkyl, and
n is 0 or 1.

31. A hardcoat composition comprising one or more multifunctional (meth)acrylate monomers or (meth)acrylate oligomers, and the addition-fragmentation agent of any of embodiments 1 to 17.

32. A hardcoat composition comprising one or more multifunctional (meth)acrylate monomers or (meth)acrylate oligomers, and the addition-fragmentation agent of embodiments 28 or 29.

What is claimed is:
1. An addition-fragmentation agent comprising: 1) a labile addition-fragmentation group, 2) a free-radically polymerizable group, and 3) a surface-modifying functional group that associates with the surface of a substrate, said addition-fragmentation agent of the formula:

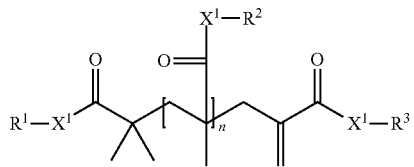

wherein
$R^1$, $R^2$ and $R^3$ are each independently $Z_m$-Q-, $Y_p$-Q'-, a (hetero)alkyl group or a (hetero)aryl group with the proviso that at least one of $R^1$, $R^2$ and $R^3$ is $Z_m$-Q-, and with the proviso that at least one of $R^1$, $R^2$ and $R^3$ is $Y_p$-Q'-
Q is a covalent bond or a linking group, having a valence of m+1;
Q' is a covalent bond or a linking group, having a valence of p+1;
Z is an ethylenically unsaturated polymerizable group (meth)acryloxy, (meth)acrylamido, and styrenic groups,
Y is a functional group that bonds with a substrate on which the addition-fragmentation agent is disposed;
m is 1 to 6;
p is 1 or 2;
each $X^1$ is independently —O— or —NR$^4$—, where R$^4$ is H or $C_1$-$C_4$ alkyl, and
n is 0 or 1.

2. The addition-fragmentation agent of claim 1 wherein at least one of $R^1$, $R^2$ and $R^3$ contain both $Z_m$-Q- and $Y_p$-Q'-, where
Q is a covalent bond or a linking group, having a valence of m+1;
Q' is a covalent bond or a linking group, having a valence of p+1;
Z is an ethylenically unsaturated polymerizable group, and
Y is an functional group that bonds with a substrate on which the addition-fragmentation agent is disposed.

3. The addition-fragmentation agent of claim 1 wherein Q is selected from from —O—, —S—, —NR$^4$—, —SO$_2$—, —PO$_2$—, —CO—, —OCO—, —R$^6$—, —NR$^4$—CO—NR$^4$—, NR$^4$—CO—O—, NR$^4$—CO—NR$^4$—CO—O—R$^6$—, —CO—NR$^4$—R$^6$—, —R$^6$—CO—O—R$^6$—, —O—R$^6$—, —S—R$^6$—, —NR$^4$—R$^6$—, —SO$_2$—R$^6$—, —PO$_2$—R$^6$—, —CO—R$^6$—, —OCO—R$^6$—, —NR$^4$—CO—R$^6$—, NR$^4$—R$^6$—CO—O—, and NR$^4$—CO—NR$^4$—, wherein each R$^4$ is hydrogen, a C$_1$ to C$_4$ alkyl group, or aryl group, each R$^6$ is an alkylene group having 1 to 6 carbon atoms, a 5- or 6-membered cycloalkylene group having 5 to 10 carbon atoms, or a divalent arylene group having 6 to 16 carbon atoms, with the proviso that Q-Z does not contain peroxidic linkages.

4. The addition-fragmentation agent of claim 1 where Q is an alkylene.

5. The addition-fragmentation agent of claim 1 where Q is a hydroxyl-substituted alkylene.

6. The addition-fragmentation agent of claim 1 where Q is an aryloxy-substituted alkylene.

7. The addition-fragmentation agent of claim 1 where Q is an alkoxy-substituted alkylene.

8. The addition-fragmentation agent of claim 1 wherein R$^1$—X$^1$— groups, and optionally R$^2$—X$^1$— and R$^3$—X$^1$— groups, are selected from H$_2$C═C(CH$_3$)C(O)—O—CH$_2$—CH(OH)—CH$_2$—O—, H$_2$C═C(CH$_3$)C(O)—O—CH$_2$—CH(O—(O)C(CH$_3$)═CH$_2$)—CH$_2$—O—, H$_2$C═C(CH$_3$)C(O)—O—CH(CH$_2$OAr)—CH$_2$—O—, H$_2$C═C(CH$_3$)C(O)—O—CH$_2$CH$_2$—N(H)—C(O)—O—CH(CH$_2$OAr)—CH$_2$—O—, H$_2$C═C(H)C(O)—O—(CH$_2$)$_4$—O—CH$_2$—CH(OH)—CH$_2$—O—, H$_2$C═C(CH$_3$)C(O)—O—CH$_2$—CH(O—(O)C—N(H)—CH$_2$CH$_2$—O—(O)C(CH$_3$)C═CH$_2$)—CH$_2$—O—, CH$_3$—(CH$_2$)$_7$—CH(O—(O)C—N(H)—CH$_2$CH$_2$—O—(O)C(CH$_3$)C═CH$_2$)—CH$_2$—O—, H$_2$C═C(H)C(O)—O—(CH$_2$)$_4$—O—CH$_2$—CH(—O—(O)C(H)═CH$_2$)—CH$_2$—O— and H$_2$C═C(H)C(O)—O—CH$_2$—CH(OH)—CH$_2$—O—, where Ar is an aryl group.

9. The addition-fragmentation agent of claim 1 wherein Y is a monophosphate, a phosphonate, a phosphonic acid, a hydroxamic acid, a carboxylic acid, and acetoacetate, an anhydride, an isonitrile group, a silyl, a disulfide, a thiol, an amino, a sulfinic acid, a sulfonic acid, a phosphine, a phenolic or a heterocyclic aromatic group.

10. The addition-fragmentation agent composition of claim 9 wherein Y is a silyl group of the formula: —SiR$^7$$_3$, wherein each R$^7$ group is independently selected from the group of alkoxy, acetoxy, and halide.

11. A polymerizable composition comprising the addition-fragmentation agent of claim 1, at least one free-radically polymerizable monomer, and an initiator.

12. The polymerizable composition of claim 11 comprising:
a) 85 to 100 parts by weight of an (meth)acrylic acid ester;
b) 0 to 15 parts by weight of an acid functional ethylenically unsaturated monomer;
c) 0 to 10 parts by weight of a non-acid functional, ethylenically unsaturated polar monomer;
d) 0 to 5 parts vinyl monomer; and
e) 0 to 5 parts of a multifunctional (meth)acrylate;
based on 100 parts by weight total monomer a) to e), and
f) 0.1 to 10 parts by weight of the addition-fragmentation agent, based on 100 parts by weight of a) to e).

13. The polymerizable composition of claim 12 further comprising 0.01 to 5 parts of a multifunctional (meth)acrylate.

14. The polymerizable composition of claim 11 further comprising a surface-modified inorganic oxide of the formula:

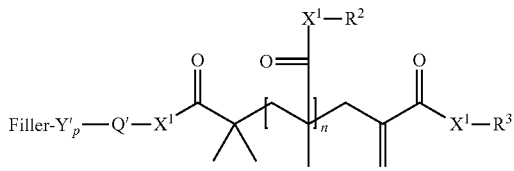

where
Filler is an inorganic oxide particle,
R$^2$ and R$^3$ are each independently Z$_m$-Q-, Y$_p$-Q'-, a (hetero)alkyl group or a (hetero)aryl group;
Q is a covalent bond or a linking group, having a valence of m+1;
Q' is a covalent bond or an or a linking group, having a valence of p+1;
Z is an ethylenically unsaturated polymerizable group (meth)acryloxy, (meth)acrylamido, and styrenic groups,
Y' is the residue of the surface-modifying organic functional group that associates with a substrate on which the addition-fragmentation agent is disposed;
m is 1 to 6;
p is 1 or 2;
X$^1$ is independently —O— or —NR$^4$—, where R$^4$ is H or C$_1$-C$_4$ alkyl, and
n is 0 or 1.

15. A hardcoat composition comprising one or more multifunctional (meth)acrylate monomers or (meth)acrylate oligomers, and the addition-fragmentation agent of claim 1.

* * * * *

UNITED STATES PATENT AND TRADEMARK OFFICE
CERTIFICATE OF CORRECTION

PATENT NO.       : 8,980,969 B2                         Page 1 of 3
APPLICATION NO.  : 14/239160
DATED            : March 17, 2015
INVENTOR(S)      : Guy Joly It is certified that error appears in the above-identified patent and that said Letters Patent is hereby corrected as shown below:

In the Specification

Column 4,

Line 19-20, delete "▬▬▬" and insert -- ▬▬ --, therefor.

Line 30, delete "sulfuric" and insert -- sulfinic --, therefor.

Columns 5 & 6,

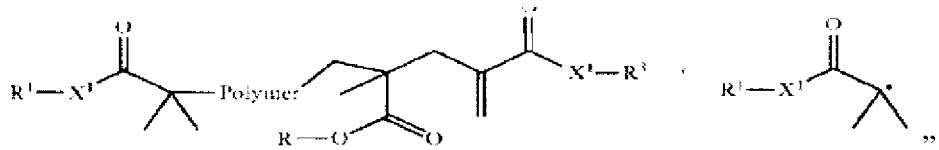

Lines 26-27, delete " [structure] " and insert -- [structure] --, therefor.

Column 15,
Line 62, delete "sulfuric" and insert -- sulfinic --, therefor.

Column 22,
Line 8, delete "-SiR$^7_3$," and insert -- -SiR$^7_3$, --, therefor.

Line 65, delete "thereofnother" and insert -- thereof. Another --, therefor.

Column 33,

Signed and Sealed this
Eighteenth Day of August, 2015

Michelle K. Lee
*Director of the United States Patent and Trademark Office*

CERTIFICATE OF CORRECTION (continued)
U.S. Pat. No. 8,980,969 B2

Line 24, delete " 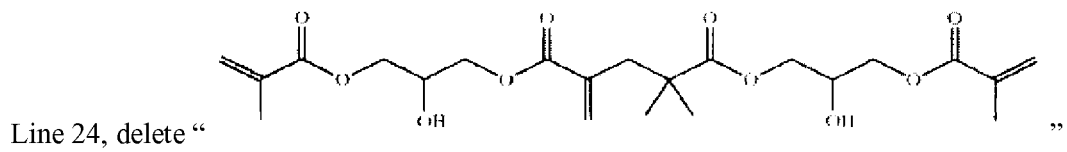 "

and insert -- 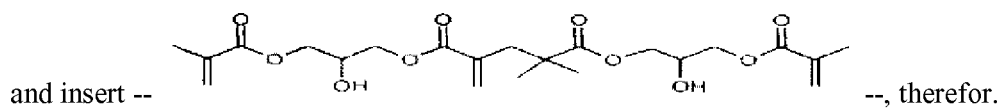 --, therefor.

Column 33,

Line 27, delete " 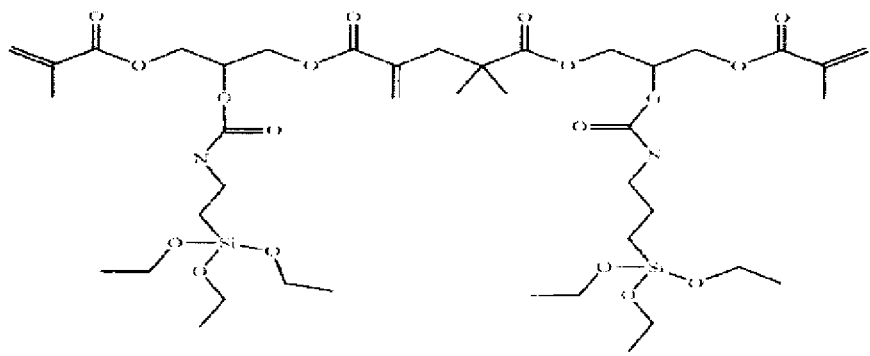 "

and insert -- 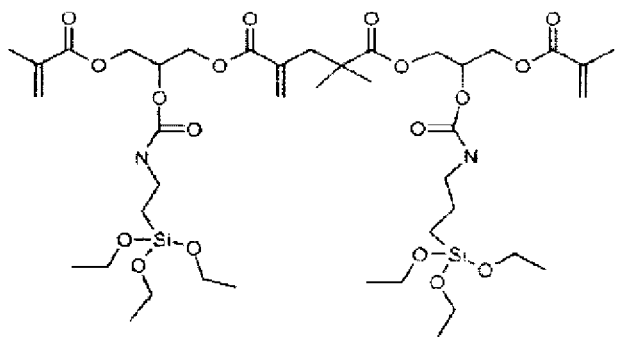 --, therefor.

Column 33,
Line 65, delete "(FTIR)" and insert -- (FTIR), --, therefor.

Column 40,

Line 27, delete " 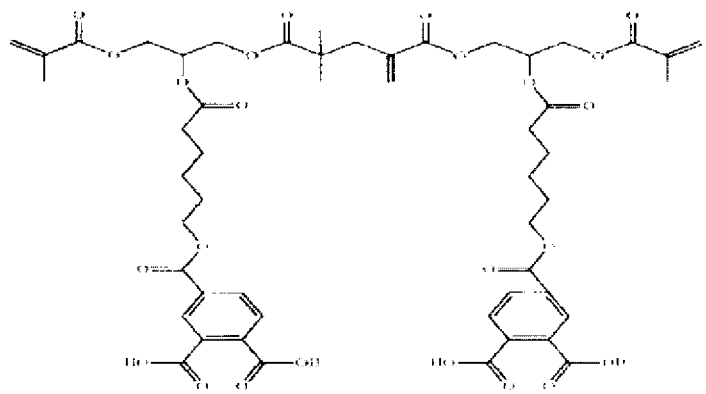 "

and insert -- 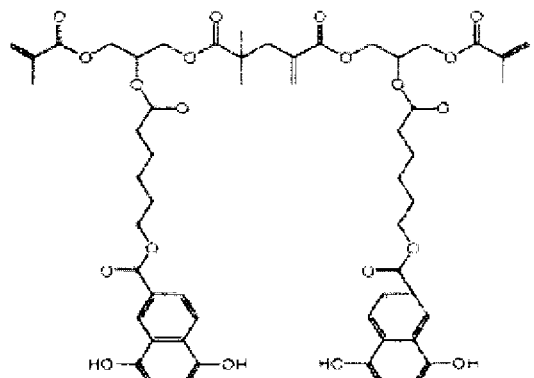 --, therefor.
Column 46,
Line 56, delete "         " and insert --        --, therefor.
Column 47,
Line 49, delete "sulfuric" and insert -- sulfinic --, therefor.
Lines 57-58, delete "H$_2$=C(CH$_3$)C(O)-O-CH$_2$-CH(O-P0$_3$H$_2$)-CH$_2$-0-," and insert
-- H$_2$C=C(CH$_3$)C(O)-O-CH$_2$-CH(O-P0$_3$H$_2$)-CH$_2$-O-, --, therefor.
Lines 57-58, delete "H$_2$=C(CH$_3$)C(O)-OCH$_2$-CH(O-C(O)-(CH$_2$)$_3$C(O)OH)-CH$_2$-0-," and insert
-- H$_2$C=C(CH$_3$)C(O)-O-CH$_2$-CH(O-C(O)-(CH$_2$)$_3$C(O)OH)-CH$_2$-O-, --, therefor.